(12) United States Patent
Nair

(10) Patent No.: US 11,669,355 B2
(45) Date of Patent: Jun. 6, 2023

(54) DYNAMIC INFORMATION VIRTUALIZATION

(71) Applicant: Dynavisor Inc., San Jose, CA (US)

(72) Inventor: Sreekumar Nair, San Jose, CA (US)

(73) Assignee: Dynavisor, Inc., Milpitas, CA (US)

( * ) Notice: Subject to any disclaimer, the term of this patent is extended or adjusted under 35 U.S.C. 154(b) by 0 days.

(21) Appl. No.: 16/039,143

(22) Filed: Jul. 18, 2018

(65) Prior Publication Data
US 2018/0341503 A1 Nov. 29, 2018

Related U.S. Application Data

(63) Continuation of application No. 14/631,731, filed on Feb. 25, 2015, now Pat. No. 10,031,767.
(Continued)

(51) Int. Cl.
*G06F 9/455* (2018.01)
*G06F 12/08* (2016.01)
*G06F 21/60* (2013.01)
*G06F 12/00* (2006.01)
*G06F 12/0846* (2016.01)
(Continued)

(52) U.S. Cl.
CPC ............ *G06F 9/455* (2013.01); *G06F 9/4555* (2013.01); *G06F 9/45533* (2013.01); *G06F 9/45541* (2013.01); *G06F 9/45545* (2013.01); *G06F 9/45558* (2013.01); *G06F 12/00* (2013.01); *G06F 12/08* (2013.01); *G06F 12/0802* (2013.01); *G06F 12/084* (2013.01); *G06F 12/0846* (2013.01); *G06F 21/57* (2013.01); *G06F 21/60* (2013.01); *G06F 2009/45575* (2013.01); *G06F 2009/45579* (2013.01); *G06F 2009/45583* (2013.01); *G06F 2009/45587* (2013.01)

(58) Field of Classification Search
CPC .. G06F 9/455; G06F 9/45533; G06F 9/45541; G06F 9/45545; G06F 9/4555; G06F 9/45558; G06F 2009/45579; G06F 2009/45583; G06F 2009/45587; G06F 12/00; G06F 12/08; G06F 12/0802; G06F 12/084; G06F 12/0846
See application file for complete search history.

(56) References Cited

U.S. PATENT DOCUMENTS

2006/0184938 A1\* 8/2006 Mangold ............... G06F 9/5016 718/1
2008/0040561 A1\* 2/2008 Bryant ................. G06F 9/5016 711/153

(Continued)

*Primary Examiner* — Charles M Swift
(74) *Attorney, Agent, or Firm* — Goodwin Procter LLP

(57) ABSTRACT

A system and method for providing dynamic information virtualization (DIV) is disclosed. According to one embodiment, a device includes a dynamic optimization manager (DOM), a process and memory manager (PMM), a memory, and a host device driver. The device starts virtual functions after booting to allow a virtual machine (VM) running a guest operating system to identify the virtual functions and load virtual drivers of the virtual functions. The PMM allocates a unified cache from the memory to facilitate coherent access to information from storage and network resources by the VM. The host device driver enables a guest process in the VM to access the information stored in the unified cache in a secure and isolated manner.

21 Claims, 11 Drawing Sheets

Related U.S. Application Data

(60) Provisional application No. 61/944,474, filed on Feb. 25, 2014.

(51) Int. Cl.
  G06F 12/084 (2016.01)
  G06F 12/0802 (2016.01)
  G06F 21/57 (2013.01)

(56) References Cited

U.S. PATENT DOCUMENTS

| | | | | |
|---|---|---|---|---|
| 2009/0265707 | A1* | 10/2009 | Goodman | G06F 9/5016 718/1 |
| 2009/0313391 | A1* | 12/2009 | Watanabe | G06F 9/45558 710/8 |
| 2010/0174820 | A1* | 7/2010 | Banga | G06F 13/385 709/228 |
| 2010/0180274 | A1* | 7/2010 | Cherian | G06F 9/45558 718/1 |
| 2011/0239213 | A1* | 9/2011 | Aswani | G06F 9/45558 718/1 |
| 2011/0271276 | A1* | 11/2011 | Ashok | G06F 9/5077 718/1 |
| 2012/0002535 | A1* | 1/2012 | Droux | H04L 45/245 370/216 |
| 2012/0102491 | A1* | 4/2012 | Maharana | G06F 9/45558 718/1 |
| 2012/0167085 | A1* | 6/2012 | Su | G06F 13/105 718/1 |
| 2012/0266165 | A1* | 10/2012 | Cen | G06F 9/45541 718/1 |
| 2012/0284712 | A1* | 11/2012 | Nimmagadda | G06F 9/5077 718/1 |
| 2013/0198459 | A1* | 8/2013 | Joshi | G06F 12/084 711/130 |
| 2013/0282994 | A1* | 10/2013 | Wires | G06F 3/0604 711/158 |
| 2013/0326172 | A1* | 12/2013 | Tsirkin | G06F 9/45558 711/162 |
| 2014/0149985 | A1* | 5/2014 | Takeuchi | G06F 9/45558 718/1 |
| 2014/0165060 | A1* | 6/2014 | Muller | G06F 9/5022 718/1 |
| 2014/0173600 | A1* | 6/2014 | Ramakrishnan Nair | G06F 9/461 718/1 |
| 2014/0282514 | A1* | 9/2014 | Carson | G06F 9/45533 718/1 |
| 2014/0289725 | A1* | 9/2014 | Velayutham | G06F 9/45504 718/1 |
| 2014/0330990 | A1* | 11/2014 | Lang | H04L 63/107 710/14 |
| 2014/0331223 | A1* | 11/2014 | Lee | G06F 13/105 718/1 |
| 2015/0012606 | A1* | 1/2015 | Gadipudi | H04L 47/193 709/212 |
| 2015/0058838 | A1* | 2/2015 | Tsirkin | G06F 9/45558 718/1 |
| 2015/0106803 | A1* | 4/2015 | Srivastava | G06Q 30/0609 718/1 |
| 2015/0199209 | A1* | 7/2015 | Tsirkin | G06F 9/45545 718/1 |
| 2015/0234669 | A1* | 8/2015 | Ben-Yehuda | G06F 3/0604 718/1 |
| 2017/0262214 | A1* | 9/2017 | Venkatesh | G06F 3/0604 |
| 2017/0337071 | A1* | 11/2017 | Scott | G06F 9/45533 |

* cited by examiner

DYNAMIC INFORMATION VIRTUALIZATION

CROSS REFERENCES

The present application claims the benefit of and priority to and is a continuation of U.S. application Ser. No. 14/631,731, filed Feb. 25, 2015 and entitled "Dynamic Information Virtualization," which claims the benefit of and priority to U.S. Provisional Patent Application Ser. No. 61/944,474 filed on Feb. 25, 2014 and entitled "Dynamic Information Virtualization," both of which are hereby incorporated by reference.

FIELD

The present disclosure relates in general to the field of computer software and systems, and in particular, to a system and method for dynamic information virtualization.

BACKGROUND

Information is at the heart of computer applications. Information refers to data emanating from various sources including storage devices, Web resources, application data, instant messages, emails, dynamic objects, etc. Enterprise information virtualization (EIV) allows applications to use information from a variety of sources. An EIV server evaluates requests for information from an information requestor, optimizes and sends queries for the requested information to individual data sources, and delivers and reports query results to the information requestor. The EIV server may also run a custom application and publish the query results on a Web service.

Information can be of two types, non-addressable and addressable. Non-addressable information is transient or ephemeral information that is alive for a short period of time. For example, information that flows through a pipe or a socket is typically gone after the application consumes the information. More importantly, non-addressable information cannot be directly accessed by other applications, hence is termed non-addressable. Addressable information is persistent or perennial information that has a permanent source, location, and storage. Using the address given to the addressable information, such as a pathname, a uniform resource identifier (URL), or a key (in the case of PCO), addressable information can be accessed by an application from another computer provided the computer and the application have the connectivity and permission to access the information. Typical examples of addressable information are files and documents that are stored on hard disks, network attached storages, on Websites, dynamic objects (e.g., PCOs), etc.

Coherency of information is important when caching information to achieve a good performance. Management of information coherency is in many ways akin to cache coherency management in processors. The underlying coherency management for either information management or cache coherency management should account for the followings. First, the unit of coherency is pre-determined. The unit of coherency is usually a block of a convenient size (e.g., one memory page). When multiple computers or applications cache the same information, the coherency protocol ensures that a block of information can at most be modified by one process or one computer at a time. Second, when a process (or computer) intends to write to a block, the process (or computer) first acquires a lock, reads the latest version of the information block from a backing store, and notifies all other processes (or computers) to invalidate the block from their caches. In cache coherency protocols, this process is referred to as read for ownership (RFO). An example of cache coherency protocols is MESI protocol. As long as a process (or computer) holds a RFO lock on a block, the process (or computer) is allowed to write to the block (also referred to as dirty writes). Subsequently, when another process (or computer) requests to read the same block, a cache manager requests the process (or computer) that holds the RFO lock to flush the block to the backing store, and release the RFO lock. Then, the cache manager enables the requesting process to acquire the RFO lock, and cache the block of information for its use.

Hardware abstraction is usually implemented by virtual machines (VMs). A hypervisor or a virtual machine manager (VMM) creates VMs on a host computer after a guest operating system (OS) starts. The hardware abstraction by the hypervisor or VMM enforces isolation among different VMs. Traditionally, the hardware abstraction slows down virtual I/O operations. Although the physical hardware may have powerful components such as a graphics processing unit (GPU) that is capable of hardware acceleration for 3D graphics and animation, the VM may indicate to the guest OS that the hardware has only a VGA-capable graphics device. Resultantly, an application on the guest OS may to resort to software rendering instead of hardware acceleration that the GPU is capable of drawing and rotating a 3D object. Software rendering takes hundreds of instructions to complete a task that the GPU can complete in a handful of instructions. In addition, the isolation by the hardware abstraction forces data to be copied across multiple hops while performing virtual I/O operations.

SUMMARY

A system and method for providing dynamic information virtualization (DIV) is disclosed. According to one embodiment, a device includes a dynamic optimization manager (DOM), a process and memory manager (PMM), a memory, and a host device driver. The device starts virtual functions after booting to allow a virtual machine (VM) running a guest operating system to identify the virtual functions and load virtual drivers of the virtual functions. The PMM allocates a unified cache from the memory to facilitate coherent access to information from storage and network resources by the VM. The host device driver enables a guest process in the VM to access the information stored in the unified cache in a secure and isolated manner.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
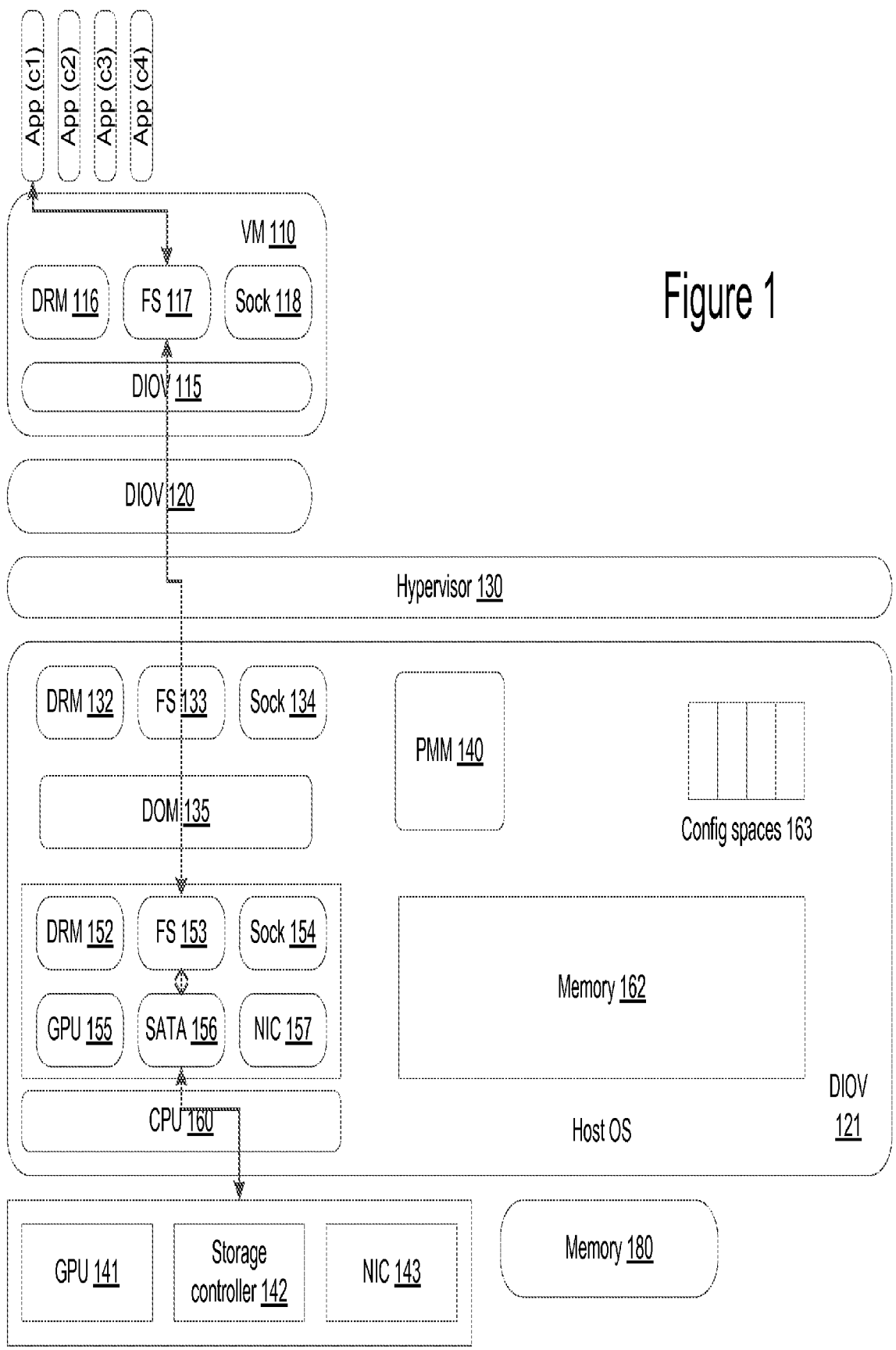
FIG. 1 illustrates a dynamic optimization manager (DOM) in the context of an exemplary DIOV device that is implemented as a hardware device, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Dynamic device virtualization (DDV) is a software device virtualization technique. Hardware devices (e.g., a graphics processing unit (GPU), a storage device, a network interface card (NIC)) are concurrently accessed from multiple guest operating systems (OS) with full hardware accelerations supported by their native driver of a computer system. DDV enhances scalability and utilization of hardware device without requiring special hardware optimization such as single root I/O virtualization (SR-IOV) from PCI special interest group (SIG). A device manager of DDV runs on a supervisory software layer, observes the behavior of a native device driver loaded on the host, and dynamically clones virtual device drivers to run in the guest OS context. DDV enhances the input/output (I/O) performance of processes and applications running on virtual machines. The dynamically cloned device-specific virtual device drivers for virtual machines perform zero-copy (direct) I/O in the execution context of the guest processes, by directly accessing the guest user memory from the host kernel based on various address space virtualization techniques (e.g., hybrid address space, kernel address space partitioning, and dynamic translation).

Dynamic I/O virtualization (DIOV) is a device model for I/O virtualization. While DDV aims at virtualizing each hardware I/O device, DIOV aims at elevating I/O virtualization to higher abstractions: direct rendering manager (DRM) instead of graphics processing units (GPUs), file systems instead of storage devices (e.g., hard disks, network attached storage (NAS)), and socket protocols instead of network interface cards (NICs). A DIOV device can be realized using any combination of hardware/software components or can be fully emulated in software that is typically inside a hypervisor. The DIOV device driver presents itself to the guest operating systems as a combination of (a) a process and memory manager (PMM), (b) a file system driver, (c) a socket protocol driver, and (d) a DRM driver. DIOV is embodied in a set of memory optimizations (e.g., shared storage caching, shared heap). The PMM pre-allocates and manages physical memory (DIOV memory) needed for DIOV memory optimizations, unbeknownst to the hypervisor and guest and host operating systems. Dynamic execution contexts (DEC) enables efficient split-context, polling based, asynchronous remote system call architecture, using shared memory communication infrastructure called streams. Enhanced hybrid address space (EHAS) enables sharing of page mappings between the host and guest execution contexts such that the guest context can access the DIOV memory, and the host context can access the guest user memory.

The present disclosure describes dynamic information virtualization (DIV) of a computer system. DIV is an evolution of dynamic device virtualization (DDV) and dynamic I/O virtualization (DIOV). Dynamic device virtualization (DDV) is disclosed in a co-pending U.S. patent application Ser. No. 14/133,396, and dynamic I/O virtualization (DIOV) is disclosed in a co-pending U.S. patent application Ser. No. 14/555,473. The present disclosure, Dynamic Information Virtualization, extends DIOV to have a dynamic optimization manager (DOM) and implement dynamic optimizations.

In dynamic translation, memory virtualization is used to ensure that page tables for guest processes are appropriately modified to work in the presence of virtualization. This is agnostic to the behavior of the guest processes. DIV builds a deep awareness of guest processes into the hypervisor (and DIOV host) and performs true process-level I/O virtualization; DIV tracks information (from storage files, network resources, persistent coherent objects, etc.) managed by a guest process, and securely isolates information accessed by each guest process. Accordingly, one guest process never sees information accessed by another guest process unless that information is explicitly shared.

The DOM provides a management infrastructure for DIOV memory optimizations providing three major functions: (a) process-level I/O virtualization, (b) process-level memory management, and (c) process-level security management. DIV provides seamless acceleration of coherent accesses to various types of information including, but not limited to, documents residing in a storage device, and Web resources accessible from intranet and the Internet.

The present disclosure introduces a new type of object, herein referred to as a persistent coherent object (PCO). DIV coherently manages the persistent coherent object that blends the persistence of cloud storage architectures like Amazon S3 and the coherency of software in-memory caching solutions like Memcached, and helps a dynamic process (e.g., a dynamic Web page) to maintain stateful information in a memory.

Some I/O virtualization techniques tried to bypass the hardware virtualization (e.g., paravirtualization), while others tried to make virtualized hardware closer to native hardware devices (e.g., direct device assignment using Intel VT-d and AMD IOMMU, and single root I/O virtualization (SR-IOV)). In contrast, DIV provides hardware abstraction that is faster and more efficient than real hardware devices on a physical computer.

Multi-tenant environment generally refers to a public cloud environment where multiple and possibly rivalling parties may share virtual machines on the same physical computer. It is of a great concern how information is safely shared among the multiple parties because one party can snoop into intellectual property or other valuable information that belongs to other parties. The present disclosure implements a secure portal through which each process can access the shared information. Thus, not only virtual machines, but also processes in the virtual machines are firewalled from seeing each other's memory or other resources on a physical computer.

Distributed File Systems (DFS) and Cluster File System (CFS) are families of file system architectures that effectively share storage devices (mount points) across multiple computers (physical or virtual machines). Examples of Network File System (NFS) include Cassandra and Hadoop Distributed File System (HDFS). DFS/CFS architectures are extremely constrained with performance optimizations such as caching because the contents of the file (data) and file system (metadata) can be changed asynchronously by any client that has mounted the file system. The DIV FS Service presented in the present disclosure is a Distributed File System architecture that permits efficient coherent read and write caching of both data as well as metadata.

Network file system (NFS) is at the heart of many file servers and is commonly referred to as network-attached storage (NAS). A NAS server may have multiple exported mount points that can be NFS mounted on other physical or virtual computers. The earlier versions of NFS (e.g., v2 and v3) are stateless and do not ensure coherent caching across multiple mount points. NFS v4 and parallel NFS (pNFS) provide read-only caching, mostly-read caching, and single writer caching. DIV provides a coherence-aware protocol that permits multiple writer caching on NFS exported mount points, as well as it does with other storage architectures.

DIV prevents NFS promiscuous mounts to implement coherent and unified caching. In other words, DIV prevents the same NFS mount point from being mounted at multiple physical or virtual computers, and exports only a single DIV mount point as a DIV device. DIV does not allow symbolic links in one NFS exported mount point to a pathname inside another NFS exported mount point.

Deduplication identifies identical copies of blocks or pages in a storage device, and ensures that only one copy of the blocks or pages is stored in the storage device. Deduplication is useful in many scenarios, for example, in a storage backup where pages that have changed incrementally are de-duplicated to reduce the volume of the backup storage drastically. DIV may not perform deduplication explicitly. Instead, unified caching implemented by DIV keeps only one copy of a file block or page in a memory even when multiple processes across multiple guest operating systems open the same file.

Storage caching and network caching have matured independently. Commonly accessed information on storage and network locations is cached in a memory or other disk devices (e.g., solid-state disks) to reduce the latency to access the information. Caching information in a coherent manner is a challenging task. The present disclosure describes a distributed unified information cache (DUIC) for storing caching information and network resources transparently and seamlessly using the same infrastructure. The DUIC can also transparently cache information from other sources, like persistent coherent objects (PCO) that is introduced for improved efficiency of dynamic programming paradigms.

Conventional generational caching refers to a coherency architecture implemented in many Web-caching processes. Generational caching maintains a generation value for each type of objects. Each time an object is updated, its associated generation value is incremented. In a post example, any time someone updates a post object, the post generation object is incremented. Any time a grouped object is read or written in the cache, the generation value is included in a key. If the generation value of the key mismatches, there is no potential of referring to cached stale objects.

The term generational caching used in the present disclosure is different from the conventional generational caching. Based on the age of a block in the cache (or page of a file, a Web resource or a persistent coherent object), the block is promoted between three pools: nursery, aging, and tenured. This terminology of aging can also be found in the subject of generational garbage collection in compilers and runtimes for object-oriented languages. However, it is noted that the DUIC generational caching mechanism disclosed herein has little in common with the conventional generational caching, or the generational garbage collection except the terminology of aging is shared.

In traditional operating systems, system calls are synchronous traps into an operating system to perform some privileged tasks such as operating on an I/O device. Similarly, a hypercall is a synchronous trap from a guest operating system to a hypervisor (or virtual machine monitor) to perform supervisory chores. According to one embodiment, the present disclosure introduces a new type of trap herein referred to as a hostcall for a guest operating system to communicate with a host operating system. In the case of a hosted hypervisor (e.g., a type 2 hypervisor), the hypervisor and the host operating system are considered to be the same entity, and a hostcall is synonymous to a hypercall.

In storage caching, as in the case of operating system page caching, each page cached in memory is backed by a file in a storage device (called the "backing file" and the "backing storage device" or simply "backing store"). The DUIC handles information such as Web resources (i.e., resources downloaded from the intranet and the Internet) and persistent coherent objects that may not have a storage associated with them. If a cache block containing such information is invalidated, the information is normally lost, and the information needs to be fetched from the Web resources or recreated in another way. According to one embodiment, the present system provides a backing store for all types of information. For example, a storage device (or a portion thereof) is assigned to temporarily store transient objects until they are invalidated.

During a writeback, a cache synchronizes the information of a cached dirty block (a block that has been modified in the cache) on to the backing store. Typically, writeback occurs only when a cache block is evicted. In the case of a DIOV active writeback, a separate thread on the host actively cleans the cache by proactively finding dirty cache blocks and writing the dirty cache blocks back to the backing store. Dirty blocks are a performance inhibitor especially in view of read for ownership (RFO) from other DUIC nodes. Clean blocks can be freely shared with other DUIC nodes.

When a cache manager runs out of free cache blocks, the cache manager evicts blocks, writes the evicted blocks back to the backing store, and reuse the freed blocks. This process is referred to as reclamation. Since reclamation is an expensive process and typically involves complicated analysis, for example, processing profile feedback and speculations (similar to block access predictions), a bunch of blocks (e.g., 10% of all blocks) may be reclaimed each time reclamation is performed.

The x86 architectures use a hardware page walking mechanism for translating virtual addresses (also referred to as linear addresses) to physical addresses using four-level page tables, PML4 (level 4), a page directory pointer (PDP) (level 3), a page directory (PD) (level 2), and a page table (PT) (level 1). The base address of the root of the paging structures in a register is referred to as CR3. In the 64-bit architecture, CR3 points to a single 4 KB page PML4. The PML4 page includes 512 entries, and each of the 512 entries points to a PDP. Each PDP includes 512 entries, and each of the 512 entries points to either a 1 GB page or a PD. Each PD includes 512 entries, each of the 512 entries points to either a 2 MB page or a PT. Each PT includes 512 entries, and each of the 512 entries points to a 4 KB page.

Hardware virtual machine (HVM) architectures (e.g., Intel VT, AMD-V) use nested page tables. Examples of HVM include, but are not limited to, Intel's extended page table (EPT), and AMD's rapid virtual indexing (RVI) or nested page table (NPT). The EPT and RVI/NPT have the same architecture as the four-level page tables. Every virtual address translation emanating inside a guest operating system goes through two steps of translation. The first translation step uses the guest's page table to translate from a guest virtual address (GVA) to a guest physical address (GPA). The second translation step uses the EPT or RVI/NPT to translate from the guest physical address (GPA) to a host physical address (HPA) that is the same as the physical address on the host computer.

According to one embodiment, a process and memory manager (PMM) builds page table segments both in the guest page table as well as in the EPT/RVI to map relevant portions of the DIOV memory into the guest process address space. Each of the levels of the x86 (e.g., Intel and AMD) page tables mentioned above have two bits including an accessed (A) bit and a dirty (D) bit. These bits can be reset by the system software (e.g., an operating system, a hypervisor). When a memory page is accessed for reading, writing, or execution, the accessed (A) bit in the page tables is set by the hardware. When a page is written to, the dirty (D) bit is set.

The system software periodically scans through the A/D bits of the pages corresponding to the DUIC cache block to determine accessed or written pages. This harvesting mechanism may be used to increment a reference count for the cache blocks. The reference count can be used by a cache reclamation process to decide whether a block is a good candidate to evict or not. Typically, a block that has a high reference count indicates that it might be referenced again in the near future. Reclamation process would spare such blocks with a high reference count during its selection process.

Memcached is a distributed associative array used by dynamic Web pages to store objects as key-value pairs. Memcached assumes that keys are transient and not intended to be persisted. Memcached is typically used to cache results of hot database queries that are not required to be alive for long. Memcached uses a least recently used (LRU) caching process to evict objects when the cache is full.

Amazon simple storage service (S3) is a storage service for the Internet and is designed to make Web-scale computing easier for developers. Amazon S3 provides a simple Web-based interface that can be used to store and retrieve any amount of data, at any time, from anywhere on the Internet. Amazon S3 allows developers to access to the same highly scalable, reliable, secure, fast, inexpensive infrastructure to run a global network of Websites. Amazon S3 service aims to maximize benefits of scalability and passes the benefits to the developers. The present disclosure introduces a new type of object architecture called "Persistent Coherent Objects" (PCO) which blends the persistence of Amazon S3 with the coherency of Memcached.

Dynamic optimization manager (DOM) is a management framework for DIOV memory optimizations. Hypervisors typically are not process-aware and simply deal with virtual CPUs on which guest operating systems schedule processes. However, the optimizations in the DIOV framework need to know about the entity that the guest operating system calls a process. A process is marked with a common address space shared among multiple executing threads. The shared address space is usually a single page table that is shared across of different constituent threads. The credential of a process is shared among threads to access various resources. For example, if one thread of a process has a permission to open and read/write a file, other threads of the same process also share the same permission.

Dynamic optimizations managed by the DOM fall under the purview of DIOV memory optimizations that rely on dynamic properties in a runtime environment. DOM optimizations are designed to work on a dynamic memory load, or a fluctuating size of a memory. The DOM optimizations remain coherent when a portion of the memory is added or freed. The data structures and processes implemented by DOM work in a modular chunk of the DIOV memory that can be added or detached at will, as opposed to spreading information throughout the DIOV memory and making the information an indivisible or inseparable blob that can only be reconfigured by saving to a disk and restoring into a reconfigured configuration. The DOM optimizations facilitate only the relevant portions of a DIOV memory to be mapped into the address space of each process, and ensures heightened security.

According to one embodiment, the DOM dynamically tracks activities of various DIOV dynamic optimizations. For optimizations that are momentarily more active and experience a higher memory demand, the DOM temporarily assigns portions of the memory that are currently allocated to DOM optimizations that are less active. The assigned portions of the memory are transparently and automatically reclaimed by the DOM after the burst of activities is over. The DOM optimizations efficiently deal with dynamic "hot plug" and "hot unplug" of memory on demand.

DOM optimizations are built up of multi-tiered processes (e.g., rehash functions for a hash table) that are dynamically ranked based on dynamic workload characterization. DOM optimizations use dynamic processes that are fine-tuned (or specialized) based on dynamic (temporal) properties of the objects they operate on. Examples of dynamic properties include, but are not limited to, exclusivity of file accesses, dynamic profile feedback, and speculation/prediction of resource access patterns. These dynamic properties are used to optimize unified caching in DIV. Another example of dynamic properties is in the case of DIV FS Server where the cache manager identifies that two guest operating systems on two computers (e.g., DIV DUIC nodes) are thrashing the same cache block repeatedly. In this case, if the two guest operating systems can be collocated on the same physical computer, this thrashing can be avoided. DOM optimizations consume dynamic data structures similar to persistent coherent objects in DIV.

The PMM pre-allocates a large pool of physical memory when a computer boots, and manages the allocated memory throughout the lifetime of DOM optimizations. Each DOM optimization that registers with PMM requests for a specific number of blocks of memory. If available, the PMM grants the requested number of blocks. The DOM optimizations do not have to know the physical addresses or physical locations of each of the memory blocks granted by the PMM. The PMM refers to the entire chunk of memory as a single entity, and addresses it with its own virtual address called DOM virtual address (DVA) that ranges from 0 . . . N (virtual) blocks. The DOM optimizations (e.g., DIV) always operate at the DVA level. When the DOM optimizations complete chores, the DOM optimizations may grant access to guest processes for appropriate blocks of memory. For example, for a process that requests a file to be opened, DIV may want to map the file descriptor and data blocks corresponding to the file, in the address space of the process. At that time, the DOM optimizations (e.g., DIV) call the PMM APIs to map the specific DVAs into the process's address space with specific access controls. The PMM translates the DVA of DOM to DOM physical address (DPA) and from DPA to the Host Physical Address (HPA) or the physical address of the computer), and updates the page tables of the process accordingly.

The memory blocks handled by the PMM can be of any size. According to one embodiment, the memory blocks are sized at 2 MB or 4 KB to align with page sizes supported by the x86 paging hardware. This gives the advantage of using the protection bits on the page tables to restrict read, write, and execute permissions on a page by the system and user processes. The page-level protection plays an important role in ensuring strong isolation across processes and across virtual machines.

Sometimes DOM and/or DOM optimizations may need to modify the mappings of guest processes that are not running. One instance is when PMM finds out that the hypervisor's memory is running dry, and PMM needs to yields a bunch of pre-allocated blocks back to the hypervisor (to its heap). At this time, PMM sends a request to all dynamic optimization managers to free as much memory as possible. The DOM and DOM optimizations respond with a list of DVAs and the set of processes from which they need to be unmapped from. All virtual CPUs of a guest process may need to be suspended when PMM remaps memory in the address space of its processes.

Each DOM optimization defines a set of PMM callbacks to respond to specific requests from the PMM immediately. Examples of the PMM callbacks include, but are not limited to, a request to "reclaim", "flush" (prior to a shutdown or suspend), and "refresh" (immediately after a wakeup, or a restart) the memory. These PMM callbacks give DOM optimizations an opportunity to save and restore their states appropriately for persistent dynamic optimizations. For example, DIV uses a persistent distributed unified information cache that is warmed up only after a significantly high volume of transactions over thousands of files or Web resources, over a period of many hours, days, or weeks. A safe flush/refresh ensures that the warm cache blocks are preserved even through a system suspend/resume, or shutdown/restart.

According to one embodiment, a DOM optimization is provided as a pair of DIV drivers—a host DIV driver in a host operating system (or hypervisor), and a guest DIV driver in a guest operating system. These DIV drivers may be kernel modules, services, or applications. The DOM framework provides a mechanism for guest DIV drivers of a DOM optimization to communicate with their host DIV drivers (and vice-versa) via a hostcall that is differentiated from a hypercall.

Classical taxonomy for virtualization identifies two types of hypervisors—Type 1 hypervisor that is a baremetal hypervisor (e.g., VMware ESX and Xen), and Type 2 hypervisor that is a hosted hypervisor (e.g., KVM or Bhyve) running as a kernel module in a host operating system (e.g., Linux, Windows, or FreeBSD). There are two approaches for Type 1 hypervisor depending on how they perform I/O operations. In Type 1A (e.g., VMware), the hypervisor itself has all the device drivers necessary for controlling I/O devices, thus Type 1A hypervisor virtualizes the CPU, memory, and I/O devices. In Type 1B hypervisor (e.g., Xen), the hypervisor manages the virtualization of CPU and memory and delegates the handling of I/O devices to a supervisory guest operating system (named Dom0 according to Xen terminology). DIOV introduces a new type of virtualization, Type 3, where I/O virtualization happens in a DIOV device that may be implemented using a combination of hardware of software components. For example, DIOV device may be implemented as a PCIe card in hardware, or emulated in software inside the hypervisor or host operating system.

Figure 11:
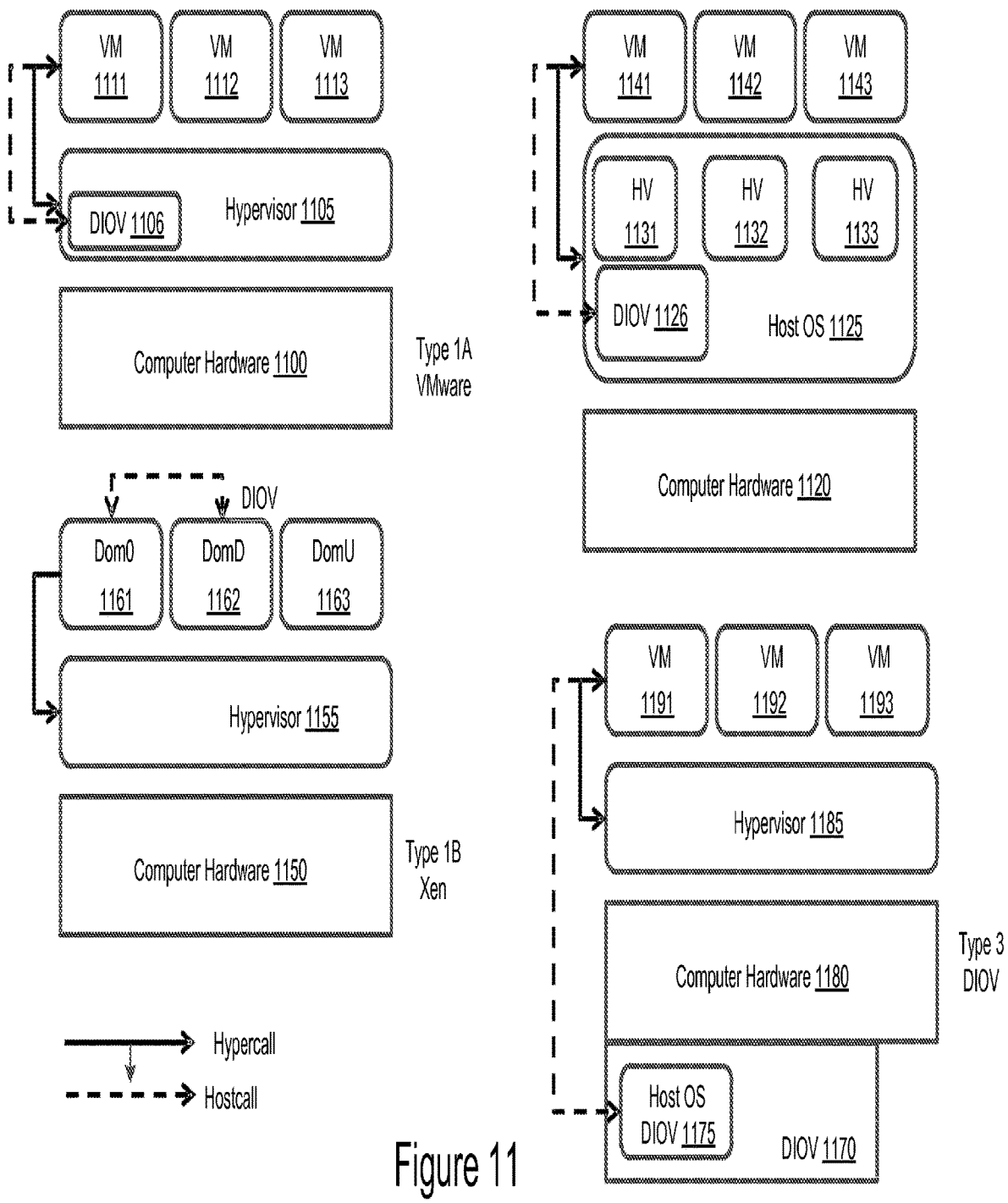
FIG. 11 illustrates exemplary taxonomy of virtualization, according to one embodiment.

FIG. 11 illustrates exemplary taxonomy of virtualization, according to one embodiment. In Type 1A hypervisor (VMware), the computer hardware 1100 and all devices therein are controlled by the hypervisor 1105. The hypervisor creates the virtual machines 1111 through 1113 for running guest operating systems. In Type 1B hypervisor (e.g., Xen), the hypervisor 1155 delegates the control of the hardware devices in 1150 to a supervisory guest operating system (DomD 1161). In Type 2 hypervisor (e.g., hosted—KVM/Bhyve), the host OS 1125 controls the hardware devices in 1120, and runs hypervisors 1131 through 1133 as kernel modules, which in turn create the virtual machines 1141 through 1143 in which the guest operating systems are run. In Type 3 hypervisor (e.g., DIOV), a DIOV device 1170 that has its own host OS 1175 is responsible for I/O virtualization unbeknownst to the hypervisor 1185. The DIOV device 1170 presents itself as a SR-IOV device with multiple virtual functions to the hypervisor 1185 to allow the virtual machines 1191 through 1193 to directly operate on these virtual functions.

The DIOV taxonomy brings the distinction between the host operating system and the hypervisor. For the purpose of isolation, DIOV host drivers are implemented in the host operating system. In Type 1A hypervisor 1105, the host OS and the hypervisor are one and the same—however it would be apt to distinguish the DIOV module 1106 inside the hypervisor as the host operating system. In Type 1B hypervisor 1155, the host operating system is a non-Dom0 but special domain or guest operating system (called DomD 1162). In Type 2 hypervisors 1125, the DIOV module 1126 is a part of the host operating system per se. In Type 3 hypervisor 1185, the host OS 1175 runs on the DIOV device 1170. The DIOV device 1170 may be a separate hardware device such as a PCIe card, or a module in the hypervisor emulating the DIOV device. The traps or supervisory control transfer from a guest operating system to a host operating system is called a hostcall (indicated by a dashed line in FIG. 11), and is differentiated from a hypercall that is a trap or supervisory control transfer from the guest operating system to the hypervisor (indicated by the bold lines in FIG. 11).

In the case of Xen DIOV, the host operating system or DomD does not have privileges to modify the address space of the guest operating system. Therefore, a PMM driver in the guest operating system is used to manage the mapping of DIOV memory used by DOM optimizations. However, using the process-awareness feature built in the hypervisor via DIV, the PMM in the hypervisor directly manages the process address spaces, and an additional PMM driver in the guest operating system is no longer necessary.

DOM (and the DOM optimizations) exercises fine-grained control of what resources (e.g., blocks of memory containing file descriptors, data blocks for a file) are visible to each process. According to one embodiment, DOM provides process-level I/O virtualization, process-level memory management, and process-level security management.

The process-level I/O virtualization aims at recognizing and managing resources (files in storage devices, network resources, persistent coherent objects) used by a process. Resources that are shareable with other processes will be efficiently shared. Resources that are private to a process will be securely protected. The process-level I/O virtualization can be implemented across multiple guest operating systems.

The process-level memory management aims to keeping track of memory used by resources belonging to each process (e.g., blocks or pages of memory corresponding to various data structures used by the DOM optimizations). When a process dies, the resources belonging to the process are reclaimed and made available to other processes.

The process-level security management aims at enforcing security decisions. The guest operating system and the host operating system are eventually responsible for making decisions about which resources can be used by which processes. For example, a guest operating system may decide that a file may be opened by process A, but not by process B. The DOM is responsible for enforcing the decision that process B cannot access any part for the file (e.g., file descriptors, data blocks, etc.). The process-level security management makes DOM and DOM optimizations appropriate in a multi-tenant virtualization environment. The process-level security is managed exclusively by the hypervisor, completely agnostic of the guest operating system, in such a way that even a rogue guest operating system will never be able to override the process level security policies enforced by the hypervisor.

The security and isolation required by the secure portal architecture is implemented on top of these three pillars, i.e., process level I/O virtualization, process level memory management, and process level security management. DOM and DOM optimizations work as effectively in a native environment as in a virtualized environment. Once virtual drivers (or guest DIV drivers) for a DOM optimization are loaded on a native system, the native system can benefit from the faster-than-native DOM optimizations.

The PMM maintains two sets of master page table mappings. In the case of x86 64-bit architecture, the master mappings correspond to page table entries covering the entire range of DIOV memory. One set of master mapping is for the host operating system, and the other set of master mapping is for the guest operating systems. The PMM augments the page tables of each guest process that performs I/O operations using the DIV framework, with appropriate page table entries from the master guest mapping. The guest page tables referred here may be the page tables created by the guest operating systems for the guest process, or the extended hybrid address space (EHAS) page table created by DIOV on behalf of the guest process.

FIG. 1 illustrates a dynamic optimization manager (DOM) in the context of an exemplary DIOV device that is implemented as a hardware device, according to one embodiment. In one embodiment, the hardware component is a PCIe card. FIG. 1 particularly pertains to Type 3 virtualization illustrated in FIG. 11. The DIOV device 121 includes a CPU 160, a built-in memory 162, and PCIe configuration spaces 163. Additionally, the DIOV device 121 may connect to hardware devices including, but not restricted to, a graphics processing unit (GPU) 141, a storage devices/controller 142, a network interface card (NIC) 143, and additional external memory 180. The host OS running on the DIOV device 121 includes (a) native device drivers for GPU 155, SATA 156, and NIC 157, (b) native drivers for DRM 152, FS 153, and socket 154, (c) DOM 135 and PMM 140, and (d) DIOV host drivers for DRM 132, FS 133, and socket 134.

When the computer boots up, the host OS on DIOV device 121 boots up first. The PMM 140 formats the DIOV device 121, particularly to configure the memory 162 and 180 to be used for DOM optimizations. The DOM 135 initializes itself and all DOM optimizations enabled on the DIOV device 121. Subsequently, the hypervisor 130 boots up. The DIOV device 121 presents itself to the hypervisor 130 as a SR-IOV capable device with multiple virtual functions defined by the configuration spaces 163 as configured by the host OS. The hypervisor 130 may be an off-the-shelf software virtualization solution such as VMware ESX, Citrix XenServer, or Microsoft Hyper-V. The hypervisor 130 does not know the details of the SR-IOV device, but lets the user configure guest VMs 110 to directly use these virtual functions (one per VM) using the PCIe Passthrough technology.

Once the VMs 110 are booted, and the VMs 110 identify the virtual functions of the DIOV device 121 assigned to them (based on the vendor/device id of the virtual functions), and load the DIOV virtual drivers including the main DIOV virtual driver 115, and DIOV virtual drivers for DRM 116, FS 117, and Socket 118. These drivers establish direct communication with the corresponding components in the host OS (DIOV host drivers for DRM 132, FS 133, and Socket 134) using one of many protocols including, but not restricted to, Streams.

When an application in the VM 110 performs an I/O operation, the requests are intercepted by the DIOV virtual drivers for DRM 116, FS 117, or socket 118. For example, an application tries to open a file for reading. The request from the application comes primarily in the form of a system call, and is intercepted by the DIOV virtual driver FS 117. The DIOV virtual driver FS 117 relays this request to its DIOV host driver counterpart FS 133. The file that is requested to be opened may already be in cache managed by one of the DOM optimizations. If so, the appropriate memory blocks of data (DB) belonging to that file is mapped into the current guest process address space by PMM 140, such that future requests to read data from that file, can be resolved directly by the DIOV virtual driver FS 117 from the cache. If the file is not cached, the DIOV host driver FS 133 passes on the request to the appropriate native FS driver 153 and then to the appropriate storage controller driver SATA 156 to perform the file I/O from the hardware storage device 142.

Figure 2:
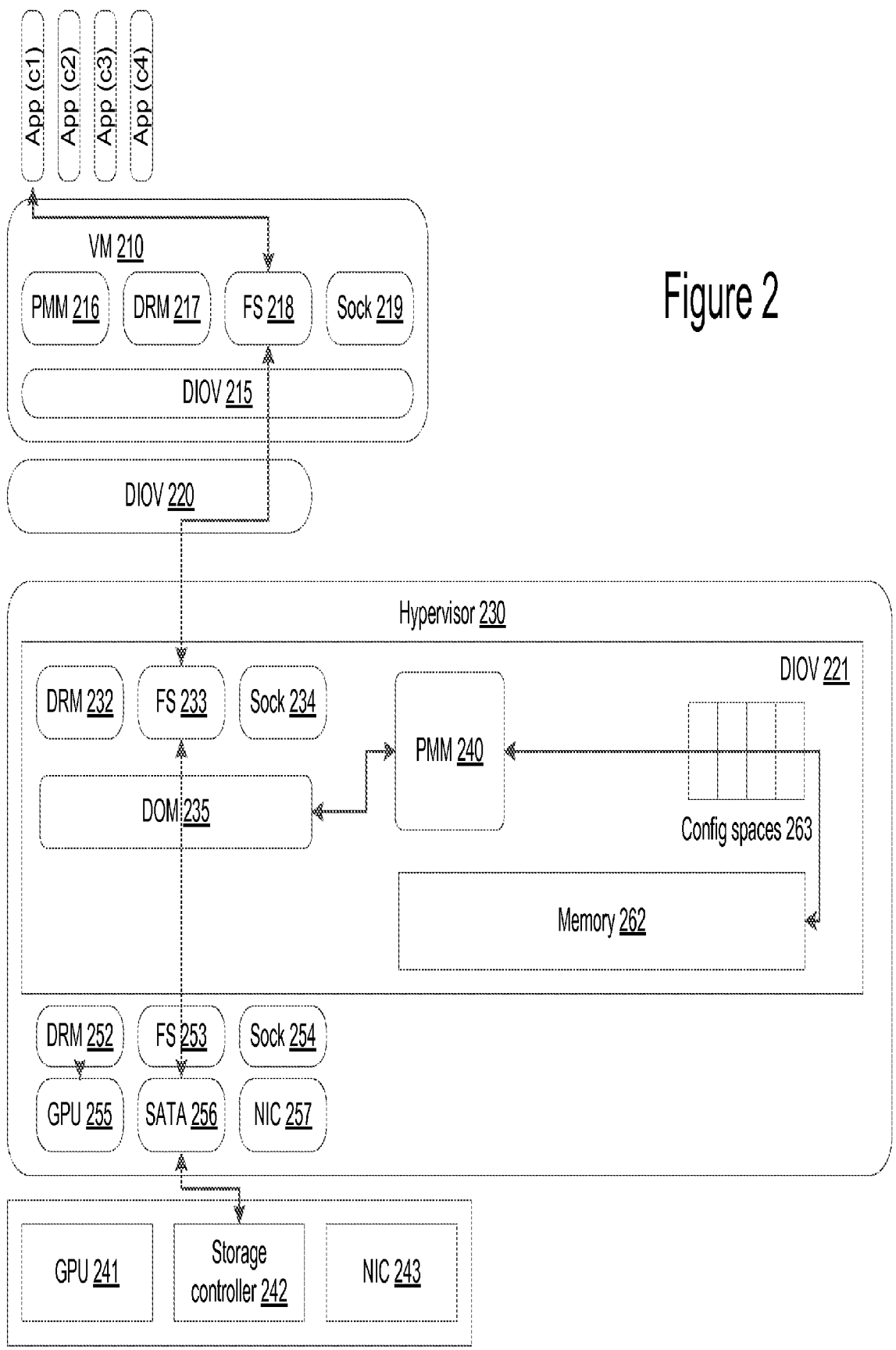
FIG. 2 illustrates a DOM in the context of an exemplary DIOV device emulated in software in a hypervisor or a host operating system, according to one embodiment.

FIG. 2 illustrates a DOM in the context of an exemplary DIOV device emulated in software in a hypervisor or a host operating system, according to one embodiment. FIG. 2 particularly pertains to DIOV 1106 of Type 1A virtualization (VMware) shown in FIG. 11. However, this architecture is similar in the case of DIOV 1126 in Type 2 virtualization (KVM/Bhyve) shown in FIG. 11, where the hypervisor is a kernel module on the host operating system.

The computer hardware includes I/O devices including, but not restricted to, GPU 241, Storage Controller 242, and NIC 243. The hypervisor 230 boots on the computer system, and initializes the native drivers for GPU 255, SATA 256, and NIC 257, and native drivers for DRM 252, FS 253, and Socket 254. The emulated DIOV device 221 is initialized in the hypervisor 230. The initialization starts with the loading of DIOV host drivers, DRM 232, FS 233, and Socket 234. The initialization of DIOV device 221 proceeds to load and start DOM 235, and PMM 240. During DIOV initialization, a virtual SR-IOV is initialized with a finite number of configuration spaces 263, and a large chunk of memory 262 and formats the memory 262 for use by DOM optimizations. The users are permitted to directly assign virtual functions of the virtual DIOV device to the VMs 210. The VMs 210 are then booted, and the behavior of the VMs 210 with respect to performing I/O is identical to that described in FIG. 1.

Figure 3:
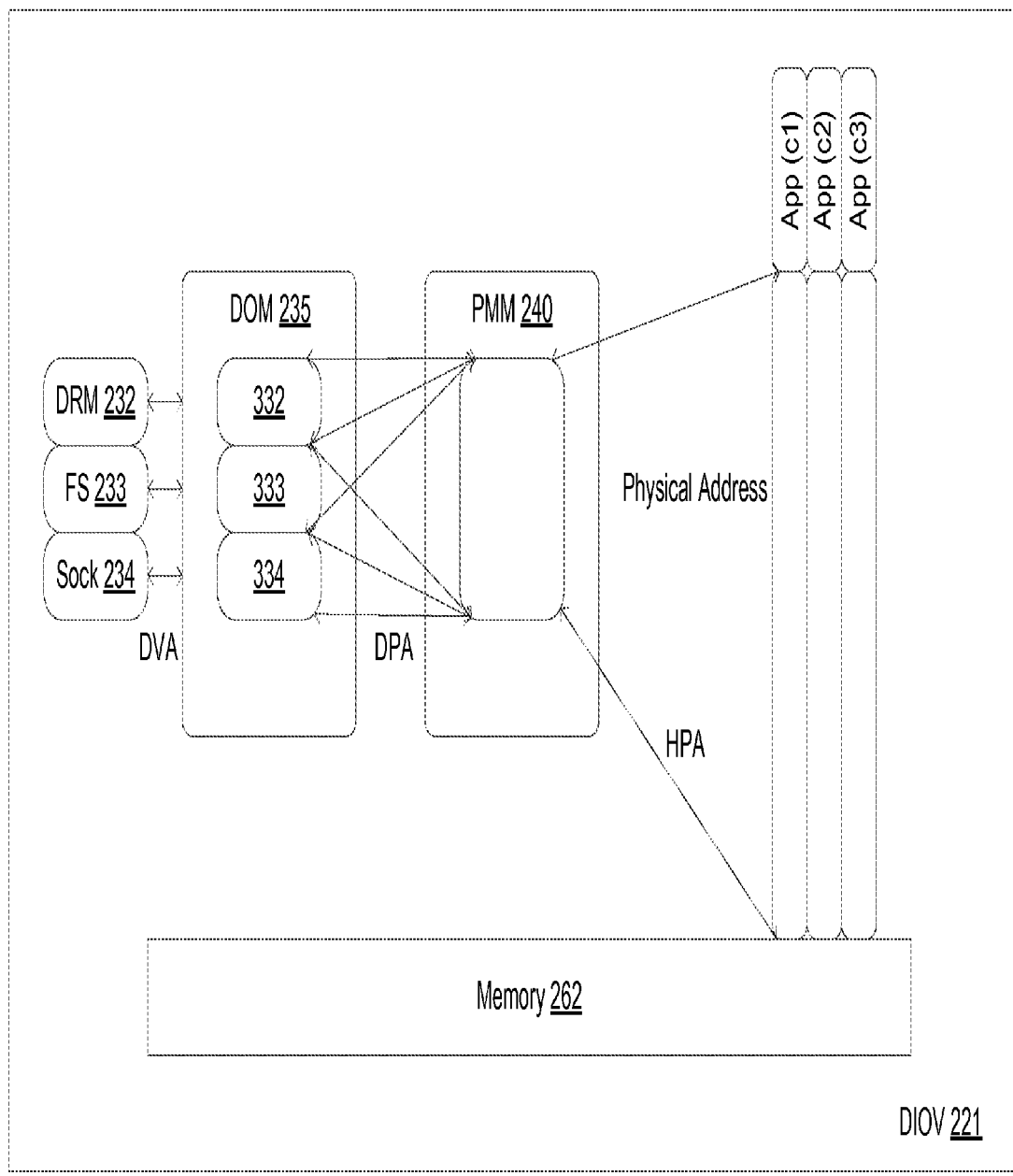
FIG. 3 illustrates the roles of DOM and PMM in the management of memory used by DOM optimizations, according to one embodiment.
Figure 6:
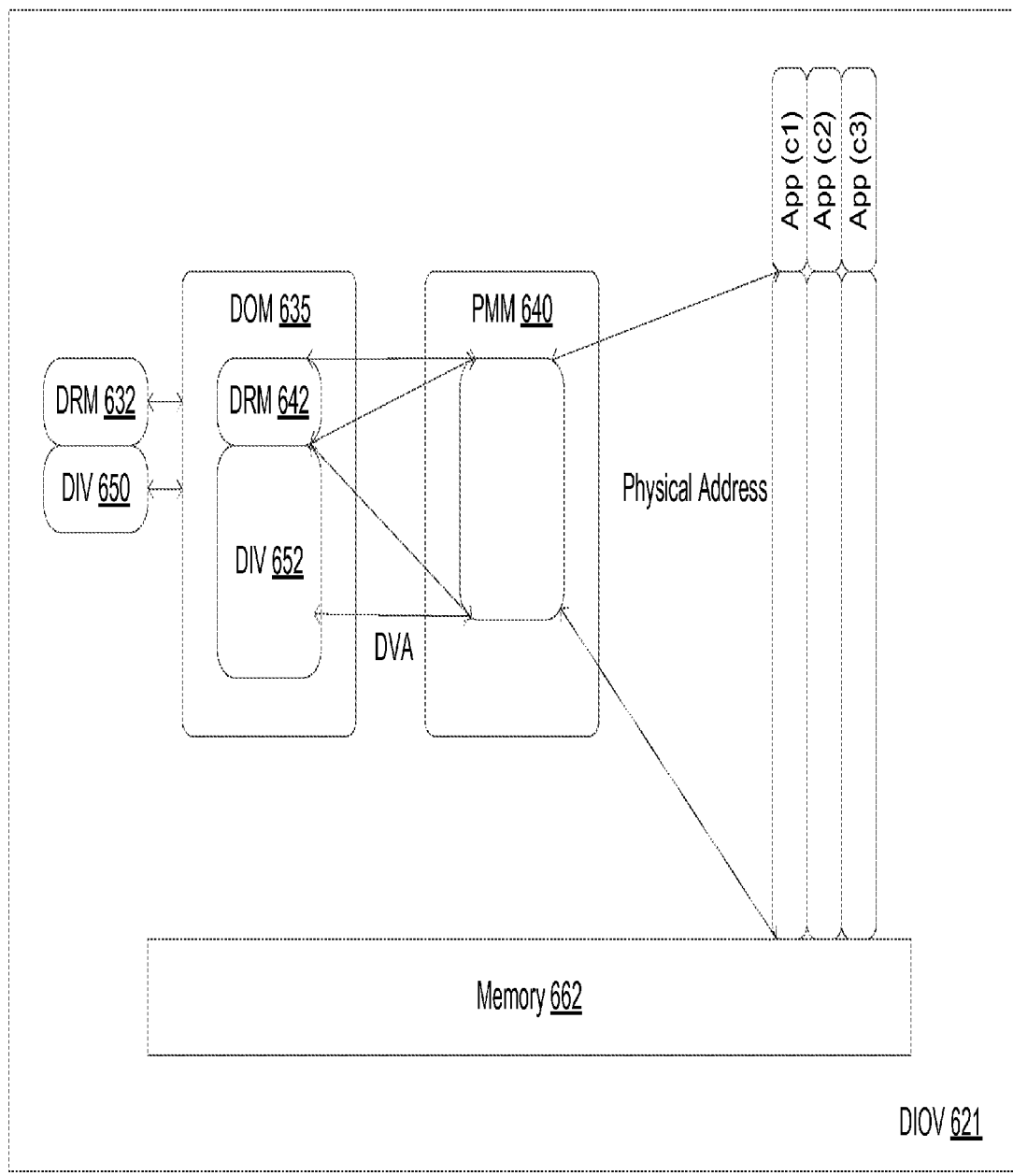
FIG. 6 illustrates DOM optimizations for DIV, according to one embodiment.

FIG. 3 illustrates the roles of DOM and PMM in the management of memory used by DOM optimizations, according to one embodiment. During the initialization of DIOV device 221 (may be a physical device as illustrated in FIG. 1, or a virtual as illustrated in FIG. 2) PMM 240 pre-allocates a large chunk of memory 262 and formats the memory 262 for use by DOM optimizations for DRM 232, FS 233, and Socket 234. Each of these DOM optimizations 232-234 requests the DOM 235 for a specific size of memory. Based on availability, the DOM 235 apportions the memory available for optimizations and gives a share to each of the DOM optimizations. The DOM optimizations perform various chores such as implementing storage/network caches, and shared heap, operating on the chunks of memory allotted to them based on DOM Virtual Address (DVA). When a DOM optimization has completed its chores (e.g., mapped a file block in storage cache), the DOM optimization calls DOM APIs to integrate this memory into the address space of the guest process. The DVA mappings provided by the DOM optimizations are converted into DOM Physical Addresses (DPA) and handed over to the PMM 240. The PMM 240 translates the DPA into Host Physical Address (HPA—or machine physical address) before mapping the physical memory pages into the guest process address space. In the event of Intel VT's Extended Page Table (EPT) or AMD SVM's Nested Page Table (NPT), the DPA is translated into the appropriated Guest Physical Address (GPA) before being mapped into the guest process address space. FIG. 6 illustrates the DOM optimization for DIV, according to one embodiment. The DIV 650 in FIG. 6 provides the combined functionality of the DOM optimizations FS 233 and Socket 234 shown in FIG. 3.

DIV is a specific DOM optimization characterized by several unique characteristics. The hardware abstraction of DIV defines a secure, faster-than-native, process-level information virtualization device. The resulting abstract hardware (DIV device) is faster and more efficient than the real hardware storage and networking devices on a physical computer. Further, DIV provides a transparent and seamless mechanism for virtualizing addressable information and managing the addressable information effectively across different computer nodes in a network, in a secure, faster-than-native manner. In particular, DIV seamlessly optimizes the access of information from storage and network sources, for example, documents in a storage device (e.g., a hard disk, a network-attached storage), Web resources on intranet and Internet. DIV also facilitates dynamic processes to create and consume persistent coherent objects (PCOs) that are implemented as a distributed associative array managed by a distributed service across a data center network.

DIV provides faster-than-native access because of (a) memory mapping and (b) transparent deduplication and I/O reordering. DIV provides memory mapping whereby all information required by a process is always mapped in its "portal" memory. The unified cache manager supported by DIV automatically (and transparently) performs deduplication and I/O reordering to reduce the bottleneck on the storage and network hardware interfaces. Cached copies of information are shared among different processes running on different virtual machines. Given a resource:offset location in the memory, there is only a single block of memory holding that the information on a physical computer or a DUIC node, which effectively performs deduplication without DIOV having to expend time and effort to explicitly perform deduplication. Further, information data is typically synched to the backing store only when a block is evicted from the cache, effectively achieving I/O reordering. The I/O reordering reduces the bottleneck on the storage and network hardware interfaces, and gives preference to performance-critical operations such as read for ownership (RFO).

According to one embodiment, DIV provides a "secure portal" for each process to access information. The secure portal is a process's own secure view into the information world. Each portal can be viewed as an infinitely large memory (arbitrarily wider than the physical and virtual memory supported by computer hardware) that coherently maps information that each process requires to performs I/O operations. The secure portals for applications can access information from transparently virtualized storage and network subsystems. The secure portals can be implemented in both native and virtualized environments. One process is not allowed to access the secure portal of another process. This process isolation is ensured by the process-level security management of DOM. The same information may be shared in the secure portals of multiple processes simultaneously. For example, if two processes are permitted to open the same file, the memory blocks corresponding to the file (e.g., file descriptor, data blocks) are mapped in the secure portals of both the processes. The shared mappings are created and managed by DIV and the processes are unaware of the shared mappings.

Figure 4A:
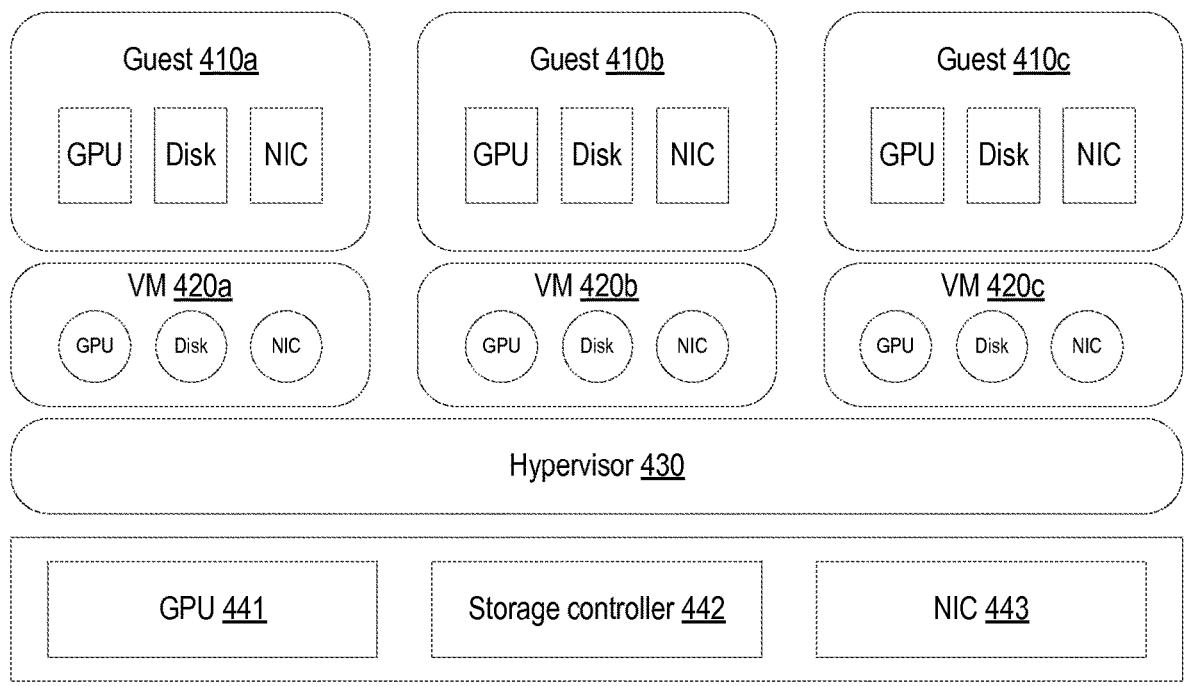
FIG. 4A illustrates system architecture of a classical virtualization, according to one embodiment.
Figure 4B:
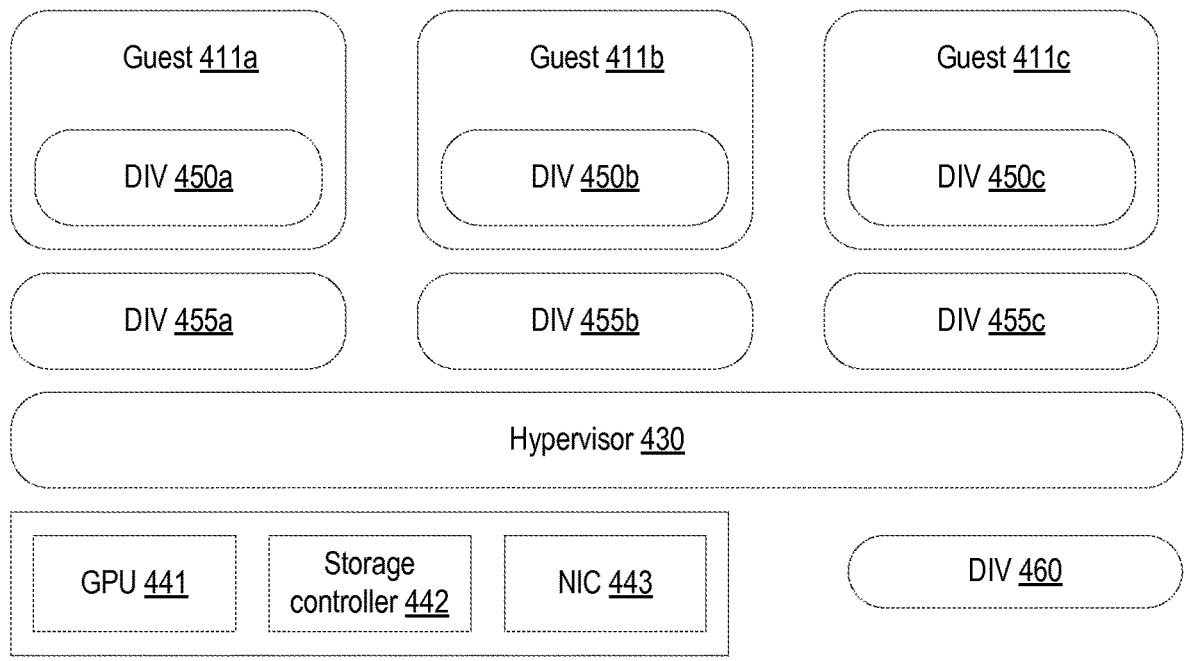
FIG. 4B illustrates system architecture of DIV, according to one embodiment.

FIGS. 4A and 4B illustrate the system architecture of DIV hardware abstraction that enables faster than native I/O virtualization. FIG. 4A illustrates system architecture of a classical I/O virtualization, according to one embodiment. The computer hardware includes I/O devices including, but not restricted to, GPU 441, Storage Controller 442, and NIC 443. The hypervisor 430 enables concurrent and secure access from each of the guest operating systems 410 to these hardware I/O devices 441-443. The security and isolation is enforced by a hardware abstraction built by the hypervisor 430, which is popularly known as virtual machines (VM) 420. The VMs 420 impose overheads on the concurrent use of I/O devices by the guest operating systems, hence the resulting I/O throughput is considerably lower than that of a native device per se. FIG. 4B illustrates system architecture of DIV, according to one embodiment. DIV replaces the classical hardware abstraction layer with its own lightweight and efficient hardware abstraction enabling applications in guest operating systems 411 to achieve significantly higher I/O throughput than what the native hardware devices themselves are capable of providing. It is noted that in literature the terms virtual machines, and guest operating systems are used interchangeably. In the forthcoming figures, the hardware abstraction is depicted as VM or DIV, whereas the guest operating systems running on the VMs are depicted as such.

Figure 5:
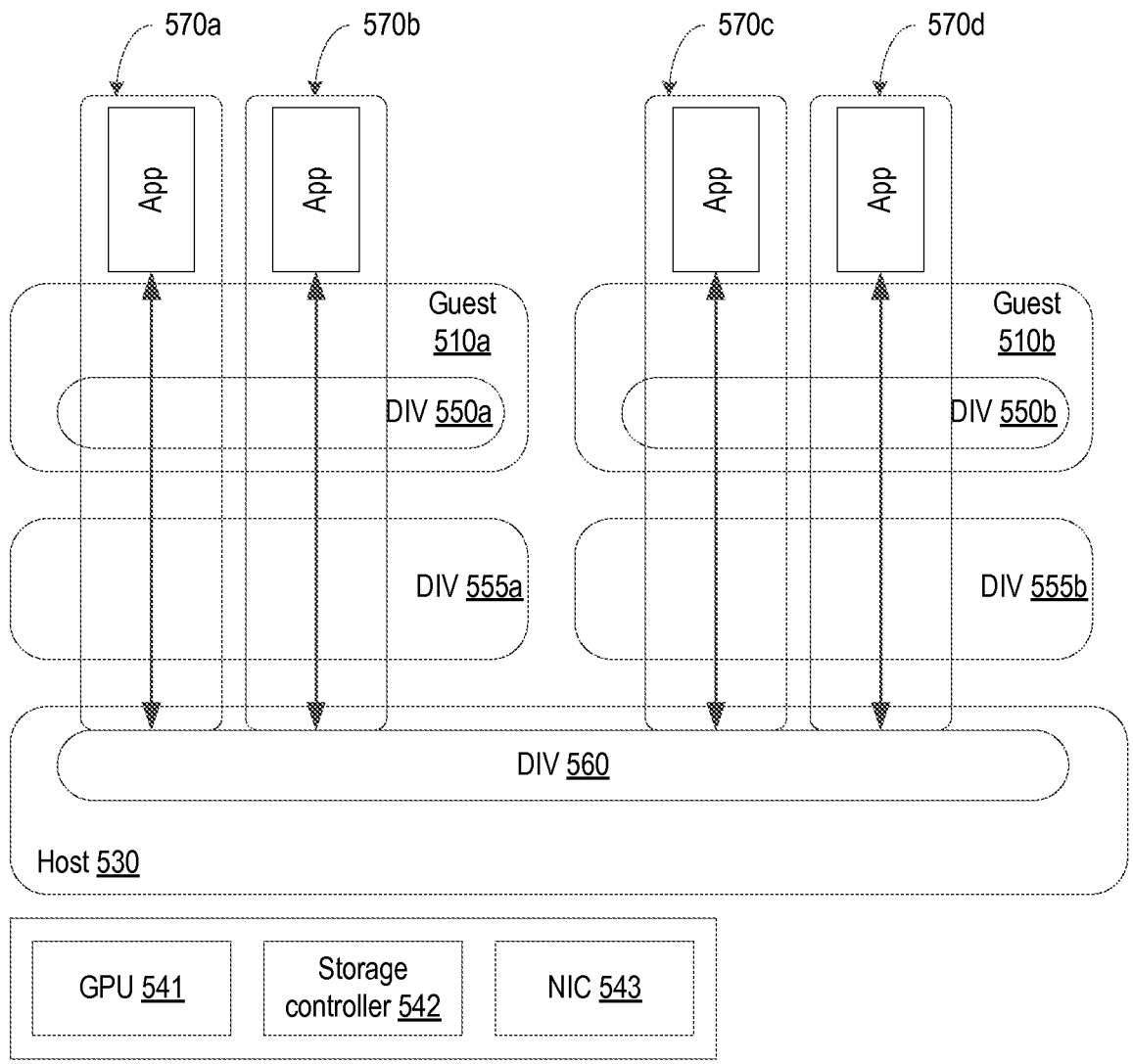
FIG. 5 illustrates exemplary secure portals implemented by DIV, according to one embodiment.

FIG. 5 illustrates exemplary secure portals implemented by DIV, according to one embodiment. The host OS 530 implements DIOV and DIV 560 that is also the DIV host driver. The host OS 530 may directly (as in the case of a Type 1A, Type 2 and Type 3 hypervisor in FIG. 11) or indirectly (as in Type AB hypervisor in FIG. 11) control the I/O devices including and not restricted to GPU 541, Storage Controller 542, and NIC 543. DIV 560 provides the hardware abstractions 555 on top of which the guest operating systems 510 boot and run. The DIV virtual driver 550 in the guest operating systems directly communicates to the DIV host driver 560 to perform storage and network I/O operations. The secure portals 570 are private isolated viewports for guest applications to access storage and networking information served by DIV host driver 560. A process can access information only through into secure portal, but cannot peek into or access information from secure portals belonging to another process (in the same guest operating system or another).

According to one embodiment, DIV provides a distributed unified information cache (DUIC). DUIC is an extension of a DIOV storage cache. The DUIC caches information from multiple sources (e.g., documents from storage devices such as hard disks and network attached storage, resources from intranet and Internet, persistent coherent objects (PCOs)) transparently and seamlessly across the computers in a data center, using a distributed service to manage the coherency of cached information. In one embodiment, the DUIC provides an integrated caching architecture common to storage and network resources—the combination of storage and network caching into one architecture is a unique contribution made by the present invention. Applications such as Web servers and search engines can benefit from the intimate bonding between storage and network caching in the DUIC. In the DUIC, a unit of information is referred to as a resource. A resource can be of any type of addressable information. Examples of a resource include, but are not limited to, a file stored in a storage device, a Web resource (downloaded from the intranet or the Internet), or a persistent coherent object (PCO).

DUIC provides a memory store for all resources accessed by running processes (either on a native computer, or on guest operating systems) and also provides a backing store for information that do not naturally have a storage (e.g., Web resources downloaded from the Internet, PCOs). As in the case of DIOV storage cache, information cached in the DUIC are transparently shared across multiple processes running on a host operating system or any guest operating systems. On the same server (a physical computer), coherency is enforced by the coherency fabric of the shared memory architecture.

The DUIC reduces the volume of I/O that goes to a target (hardware) storage and network devices. The DUIC delivers significantly high I/O throughput to the applications that use the information resources, while operating within the throughput/bandwidth limitations of the hardware I/O devices.

The DUIC maintains several data structures. Some data structures are visible to the guest (virtual) DIV driver while other data structures are visible only to the host DIV driver. According to one embodiment, the data structures visible to the virtual DIV driver include metadata-like resource descriptors (RD), resource block descriptors (RBD), and data blocks (DB). The DUIC data structures visible to the host DIV driver include, but not limited to, a process table, a resource table, a resource block table, DOM optimization registry, memory mapping tables, and data structures used during reclamation and writeback phases.

The DUIC provides a generational caching (DUICGC) scheme to effectively operate on a huge number of data blocks during active reclamation and writeback phases. The DUICGC ensures that sparsely accessed blocks surrender unused sub blocks to ensure minimal wastage of memory.

According to one embodiment, the DUICGC can be applied to x86 architecture using various stages of data block. Data blocks (DB) belong to resources in one of three pools: nursery, aging, and tenured. Every data block starts in the nursery pool, and hot DBs progress through the aging pool and end up in the tenured pool. DUICGC profiles DBs to determine their hotness in the DUIC. According to one embodiment, the hotness of a DB is determined by a reference count that is incremented by the virtual DIV driver when a DB is accessed by a process, or the information is collected by harvesting the accessed/dirty bits on the x86 page tables. DBs are promoted to the aging and tenured pools when the DBs are scanned for the process of reclamation, or during active writeback. For efficiency, the reclamation and active writeback phases normally operate only on DB's in the nursery. Once in a number of visits (e.g., 512 or 1024 visits), DUICGC scans through the entire aging and tenured pools to ensure that DBs are assigned to the right pools.

DUICGC also takes the responsibility to ensure that DBs that were once hot, but not accessed anymore, are not locked in the aging and tenured pools via a process referred to as cache rebalancing. The cache rebalancing may be implemented using reference counts from the guest processes or using counts harvested from the accessed/dirty bits off the x86 page tables. If using reference counts from guest processes, DUICGC keeps track of the previous and current reference counts for each DB. If, during a visit, the reference counts are found to be the same, DUICGC determines that the DB has not been accessed since the last visit (or during the last interval). Both the previous and current reference counts are decremented by the average reference count during the last interval. If using harvesting of accessed/dirty bits of x86 page tables, if a DB has not been marked accessed or dirty by the processor during an interval, the reference count is decremented appropriately.

DUICGC provides effective management of the DB space. The effective management of the DB space is rendered difficult because (a) management of page tables can be expensive, (b) the size of DBs shared across multiple processes significantly impacts the cost of memory and analysis for reclamation and writeback. If DIV were to manage DBs at smaller sizes like 4 KB pages, there is less fragmentation (and more data density), but DOM needs more memory to manage the page tables across process. If DIV were to limit itself to larger page sizes (2 MB), fewer pages are needed to manage the page tables per process resulting in much more sparse data (and fragmentation and wasted memory space). DUICGC manages the DB space in two ways. In the first method, DIV shares DBs across processes at the same granularity as their allocation. DIV allocates 2 MB pages for DBs in the nursery. When hot DBs get promoted into aging, the same DBs are broken down into 4 KB pages—so the hotness of DBs is tracked at a finer granularity. DBs that are cold get instantly reclaimed and recycled. In the second method, DIV shares virtual DBs of a large size (2 MB) across processes (called partitions), but each partition is composed of 4 KB pages that can be tracked for hotness independently, whereby cold pages can be instantly reclaimed and recycled before the DBs progress into the aging pool.

The DUIC coherently operates on a single resource from multiple physical computers. On a single physical computer (DUIC node), a DB uniquely identifies a unique resource: offset location. Across different DUIC nodes, DUIC manages coherency of information stored in the DBs that refer to the same resource:offset location using a read for ownership (RFO) based DUIC cache coherency protocol described below.

Any number of DUIC nodes can simultaneously read a resource:offset location. When one of the DUIC nodes needs to write to a particular resource:offset location, the DUIC node invalidates the DBs on other DUIC nodes that correspond to that resource:offset location. The invalidation requires the last owner of the DB to flush the changes to the backing store. The new writer reads the modified content of the resource:offset location either from the last writer's DB or from the backing store. Once a DB acquires an RFO status, the DB can perform any number of dirty writes until another DUIC node reads or writes to that resource:offset location. For Web resources that are downloaded from intranet or Internet, DUIC nodes validate if the resource has changed on the Web location. DUIC validates Web resources by either using a strict coherency model where every access to the Web resource checks the headers on the Web location (e.g., Linux curl –I command) or detect modifications of the network resource using DIV cache coherency protocol (FRO) if the source machine is also a machine in the DIOV/DIV fabric, or using a relaxed coherency model where a Web resource once accessed is assumed to be coherent for a grace period (e.g., 5-20 minutes).

DIV honors all contracts offered by the host and guest operating systems. Typically, in the presence of a software managed memory cache, all operations on a file opened for synchronous I/O or direct I/O are required to bypass the cache and directly go to the hardware devices. This is the default behavior of DIV. However, it is noted that in the case of DIV devices, the hardware storage devices are tightly integrated with the memory cache and exposed to the applications in the guests. Hence, in the case of DIV, to comply with the synchronous I/O and direct I/O requirements, committing data to the memory cache should suffice. DIV guarantees that the data is appropriately written back to the backing store at the right time. A user assertion is provided to enforce the writeback semantics of the caches.

Storage virtualization of DIV is responsible for providing a seamless interface for integrating storage devices in the data center into a single logical unit, and enabling every physical computer to access the single logical unit transparently. Distributed storage service avoids the overhead of a centralized maintenance of storage devices in a data center. Each mountable storage device (e.g., hard disk partitions, NFS mounts) is controlled by a dedicated service (e.g., DIV FS server). DIV FS servers are similar to NFS servers except that DIV FS servers are aware of the underlying coherency protocols governing the access of information across different DUIC nodes. This enables DIV FS servers to permit write-caching even in a multiple writer scenario that NFS 4.0 or pNFS does not permit.

According to one embodiment, a DIV FS server exports direct attached storage (DAS) devices such as spindle hard disks, solid state disks to be accessed by other physical computers.

A DIV FS server controls a single DIV device. A DIV device is an abstract entity created by the DIV FS server for managing a DAS device, or a NFS mount point. A DIV device can be mounted on a remote computer similar to a NFS mount—either in a guest operating system running on the same physical computer or in a remote physical computer, or in a guest operating system running on a remote physical computer. NFS mounts on NAS devices are exported by a DIV FS service in the same way as DAS devices. The NFS mounts are first mounted on one of the physical computers, and then the mount point is exported by DIV FS server on that computer as a DIV device. A data center wide central registry is maintained to ensure that the same NFS mount is not exported by different physical computers. A DIV FS server is able to disambiguate aliases (e.g., NAS1:/x/y and NAS1:/x are the same mount) by requiring the administrator to ensure that there are no promiscuous references (e.g., a symbolic link within a NFS mount referring to files or nodes in another NFS mount). When DIV adds a symbolic link, DIV raises an error if the symbolic link results in a promiscuous reference. An optional crawling service may be provided to crawl through NFS mounts to detect (a) if a NFS mount is mounted by DIOV and NFS simultaneously (potentially on different computers), and (b) if there are any aliasing symbolic links. The crawling service may be run by the administrator once in a while (e.g., when a new NFS node is added).

DIV FS servers maintain the coherency registry for all resources. The read for ownership (RFO) attributes corresponding to all resource:offset location can instantaneously be accessed from the coherency registry. The coherency registry removes a need to have a centralized data-center-wide coherency engine that can become the bottleneck for performance.

Exclusivity of information resources is managed by DIV FS servers. Exclusive use of information resources significantly reduces the coherency traffic between the DIV FS servers and the mount points of the DIV devices. If a DIV device is exclusively mounted (i.e., mounted only on a single physical or a virtual computer), all files in the DIV device can be exclusively accessed by DUIC operations on the DUIC node. Although a DIV device may be shared mounted (i.e., simultaneously mounted on more than one physical or virtual computers), if a file is opened only by a single DUIC node, the file can be exclusively accessed by DUIC operations from the DUIC node.

Pathname resolution (or pathname lookup) is performance critical in DIV. Pathname resolution in DIV is particularly complicated because of the transparent architecture of mount points, and symbolic links in many operating systems, and the combination of network and storage namespaces. Thus, an operating system has to walk through each node (component) in the pathname, and verify that component directories and nodes exist, and that each component has access permission for the user attempting to access the resource. In the case of resources that require frequent pathname resolution (for example, small files that are opened in quick succession), the pathname resolution can become a bottleneck, especially on guest operating systems. DIV expedites the pathname resolution using pathname caching, the coherent directory cache, and the coherent name cache.

In one embodiment, DIV uses pathname caching for pathname resolution. A pathname that has been successfully opened is added to a cache. A separate table relates the cached pathname to the identifiers of each component of the pathname (e.g., Linux inodes corresponding to component directories or nodes). Thus, if one of the component directories or nodes is modified (e.g., permissions), deleted, or renamed, the cached pathname is invalidated. Pathname caching is useful both in the guest operating system as well as the host operating system.

In another embodiment, DIV uses a coherent directory cache for expediting pathname resolution. The DIV FS server maintains a coherent directory cache for DIV devices. The coherent directory cache is visible to a guest operating system, and the guest operating system uses the coherent directory cache to expedite the lookup and access validation of each component directories and nodes without making a hostcall to validate each pathname component. The coherent directory cache also provides a rich set of attributes about the resource to accelerate many more operations than just pathname resolution. Some examples are directly opening resources, accessing and modifying resource attributes, all happening directly from the guest operating system. In yet another embodiment, DIV uses a coherent name cache. The coherent name cache is used across multiple types of information including files in storage devices, Web resources from intranet and Internet, and persistent coherent objects (PCOs).

The performance of storage virtualization relies heavily upon the organization of data and the storage devices that hold the data. For storage intensive systems and applications such as distributed database management systems (DBMs) and distributed search engines, shared storages are a significant bottleneck for performance because all accesses have to be mediated through the same hardware controllers that may be overloaded. Traditionally, such systems and applications resort to replicate data across multiple storage units to divide the load on the hardware controllers. DIV avoids the data replication and keeps just one copy of the data. Resultantly, DIV saves in storage space and data management overheads to ensure coherency of data across multiple physical devices such that every change is reflected in all replicated copies atomically.

According to one embodiment, DIV provides an infrastructure to support persistent coherent objects (PCOs) to be used by dynamic processes in various domains (e.g., dynamic Web pages). The PCOs are implemented as a distributed associative array of key-value pairs, and managed by a distributed service across a data center network. As in the case of Web resources, DIV provides a backing store for a PCO that is persisted for any length of time until they are invalidated by DIV or the process that generates the PCO.

According to one embodiment, DIV provides a coherent name cache on each DUIC node. Each DUIC node expedites the lookup of an object by name (e.g., pathname for a document in a storage device, URL for a Web resource, a key for a PCO). The coherent name cache maps a name to the resource descriptor (RD) in the DUIC. Every name that is successfully resolved (and accessed) on a DUIC node is cached in the coherent name cache. When a name no longer exists (e.g., when a file is deleted, or a Web resource or a PCO is invalidated), its entry is removed from the coherent name cache.

According to one embodiment, DIV provides transparent information retrieval agnostic of the resource types (be they files in storage devices, network resources in the internet or intranet, or persistent coherent objects). During the information retrieval, the actual information virtualization occurs. Depending on the context in which the retrieval service is requested, and depending on the name (e.g., a pathname, URL, a PCO key) and the type of information requested, information retrieval resorts to the services of the appropriate clients to work with their servers (maybe on remote machines) to retrieve the requested information. Information retrieval is also responsible for assigning a backing store for information such as Web resources or PCOs at the time of creation.

Figure 7:
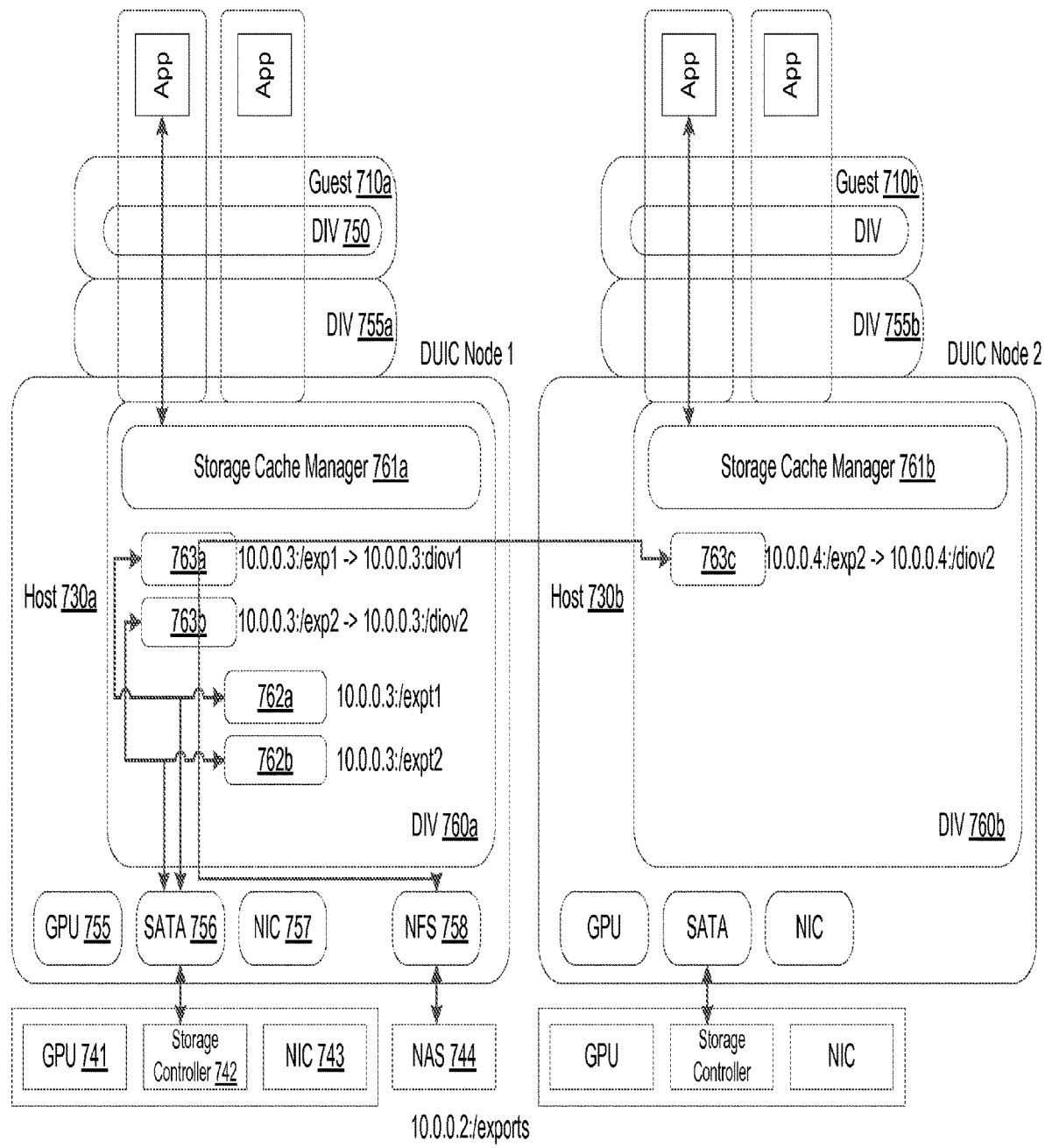
FIG. 7 illustrates an exemplary distributed storage service in a virtualized environment, according to one embodiment.
Figure 8:
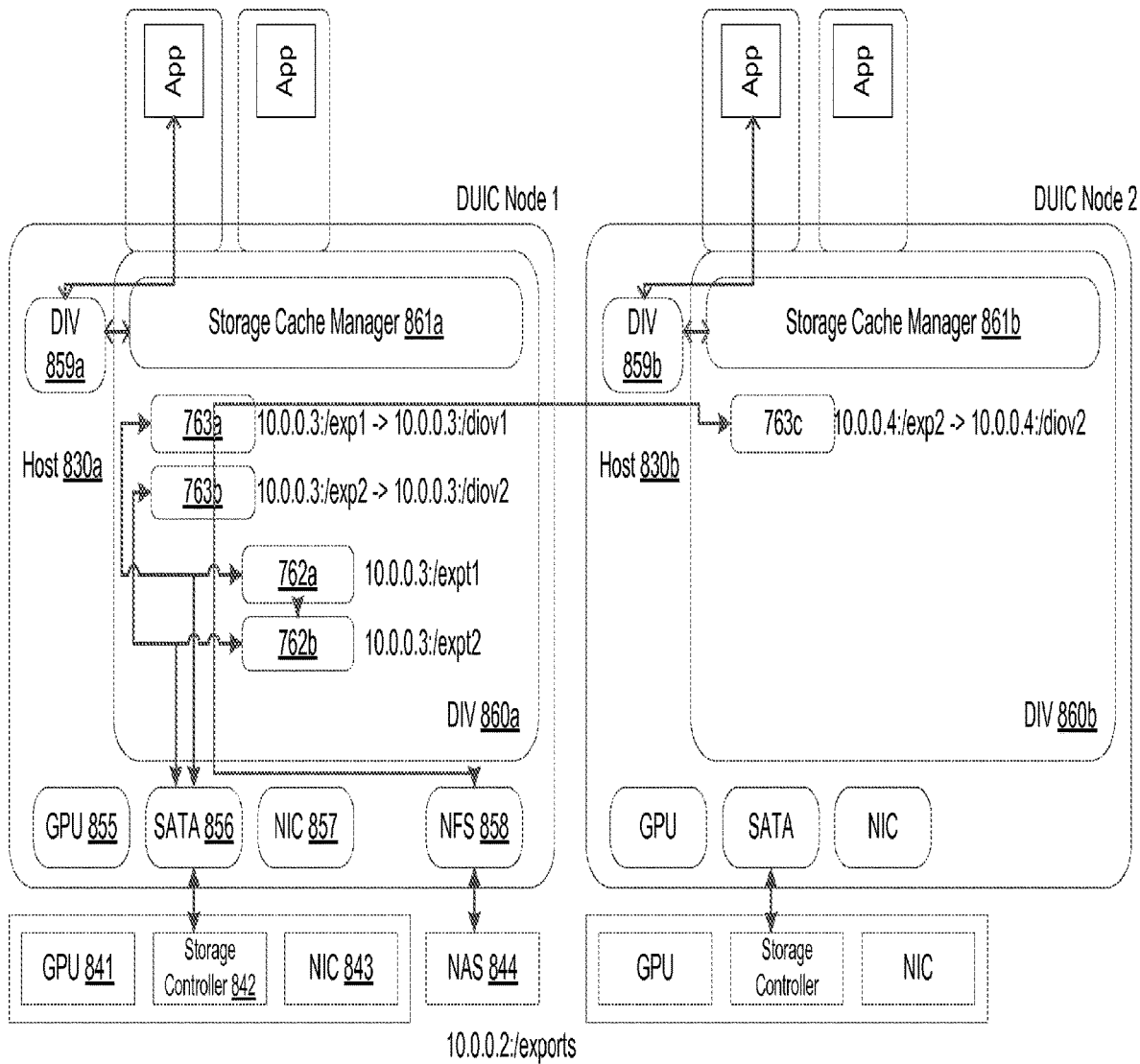
FIG. 8 illustrates an exemplary distributed storage service in a native environment, according to one embodiment.

FIG. 7 illustrates an exemplary distributed storage service in a virtualized environment, according to one embodiment. FIG. 8 illustrates an exemplary distributed storage service in a native environment, according to one embodiment. The descriptions are provided in the context of FIG. 7, but the explanation of FIG. 8 naturally follows from the description of FIG. 7. The host OS 730 may directly (as in the case of a Type 1A, Type 2 and Type 3 hypervisor in FIG. 11) or indirectly (as in Type AB hypervisor in FIG. 11) control the I/O devices including and not restricted to GPU 741, Storage Controller 742, and NIC 743. An internal hard disk attached to Storage Controller 742 and an external NAS 744 are mounted on the host OS 730. The FS Server 1 762a exports the mount point of the internal SATA hard disk on 742 as DIV global device 10.0.0.3:/exp1, and the FS Server 2 762b exports the mount point for the NAS 744 as DIV global device 10.0.0.3:/exp2. The FS Client 763a mounts the exported DIV global device 10.0.0.3:/exp1 as DIV local device 10.0.0.3:/diov1. Similarly, the FS Client 763b mounts the exported DIV global device 10.0.0.3:/exp2 as DIV local device 10.0.0.3:/diov2 and the FS Client 763c mounts the exported DIV global device 10.0.0.3:/exp2 as DIV local device 10.0.0.4:/diov2. The mounted DIV local devices may be mounted on the guest operating system directories enabling guest processes to directly access the files and contents on these devices. The storage cache manager 861 and a part of DIV 859 are responsible for managing the secure shared cache for the DIV storage subsystem.

Figure 9:
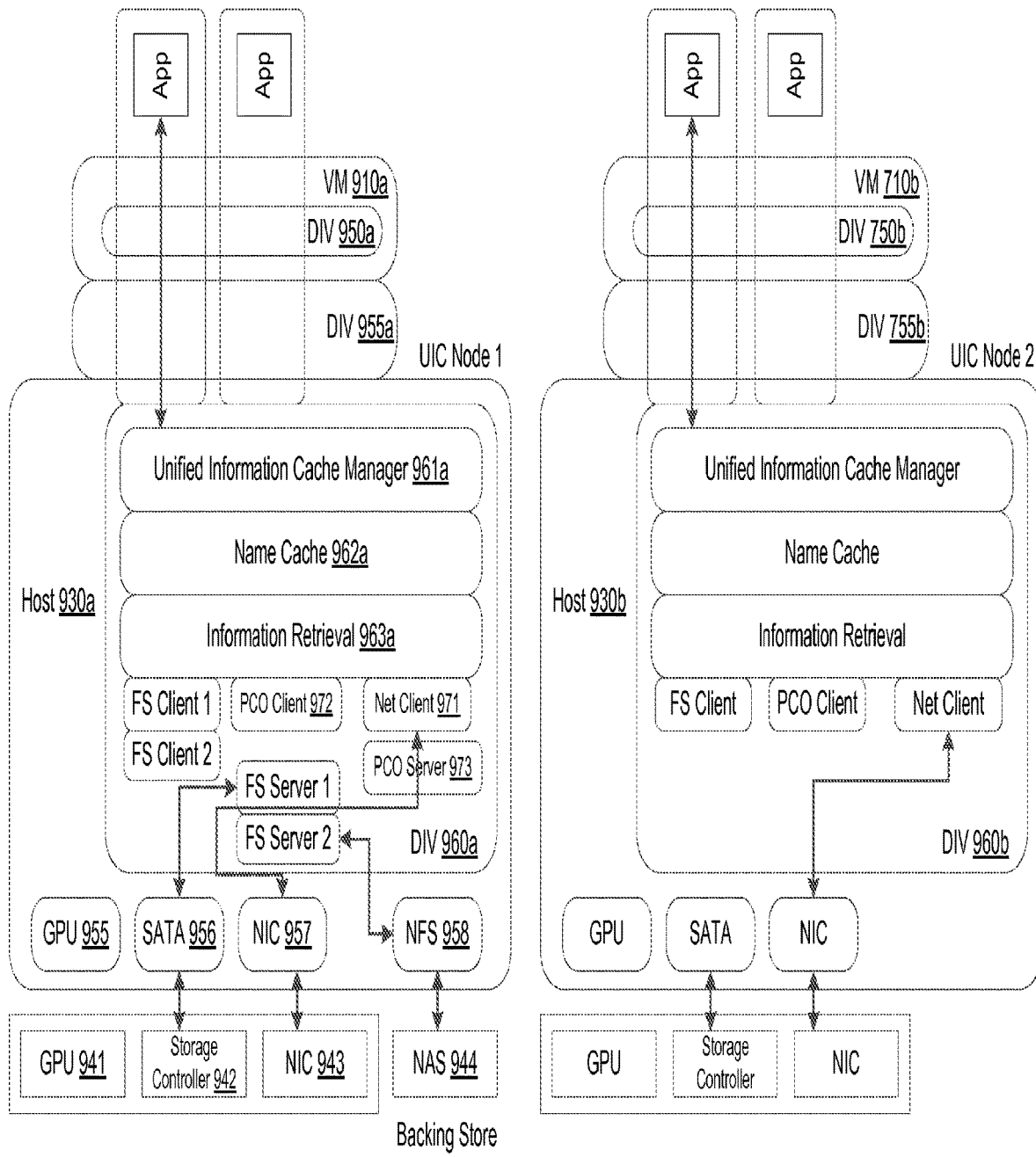
FIG. 9 illustrates an exemplary unified information cache in a virtualized environment, according to one embodiment.
Figure 10:
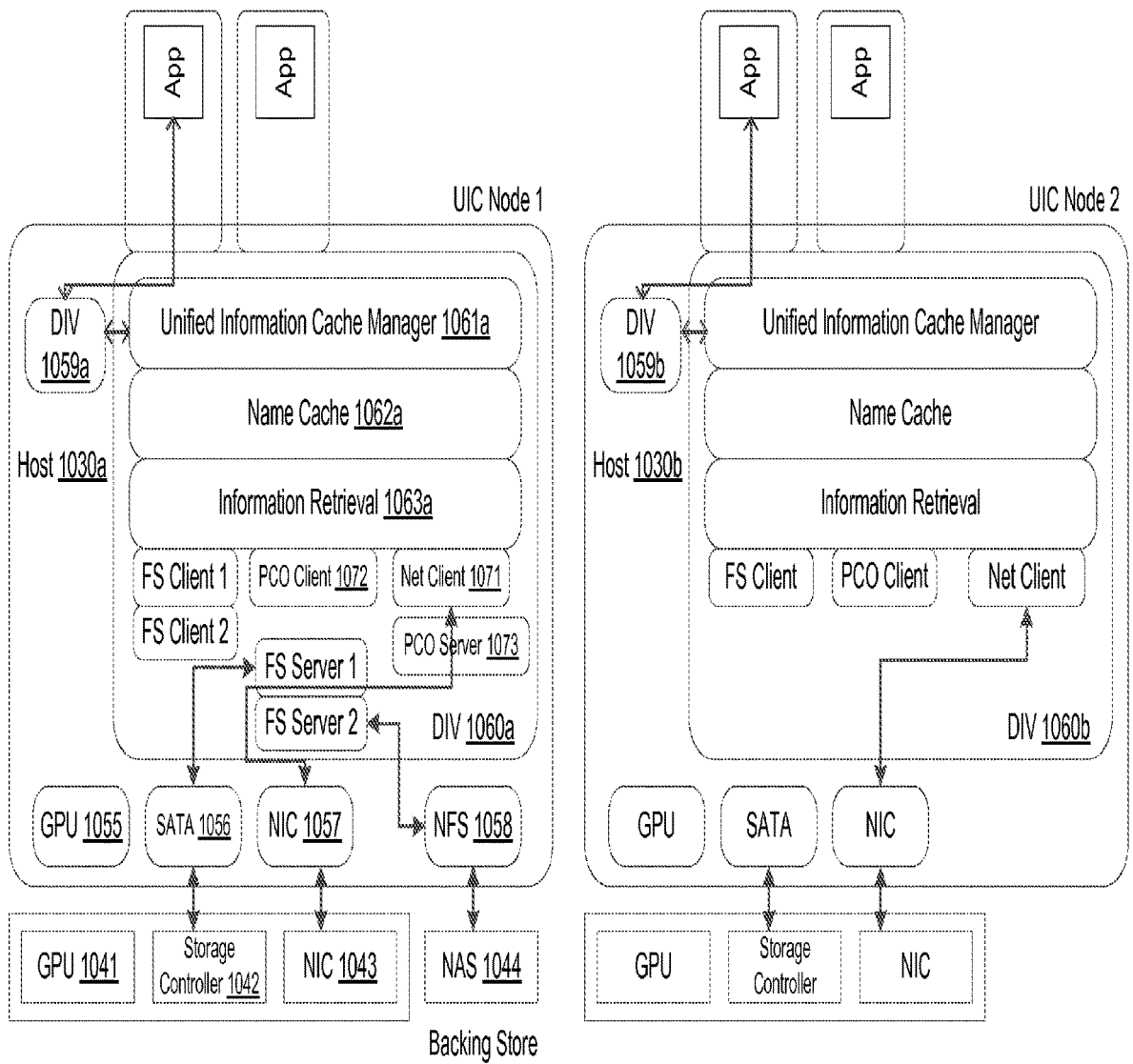
FIG. 10 illustrates an exemplary unified information cache in a native environment, according to one embodiment.

FIG. 9 illustrates an exemplary unified information cache in a virtualized environment, according to one embodiment. FIG. 10 illustrates an exemplary unified information cache in a native environment, according to one embodiment. FIGS. 9 and 10 extend FIGS. 7 and 8 by (a) extending the cache manager to be a single unified information cache manager 961 that caters to information from all domains (including by not restricted to storage, network, persistent coherent objects or PCOs), (b) introducing the name cache 962 that is primarily a metadata cache that facilitates quick lookup of pathnames and unified resource locators (URLs) from the guest itself, (c) a common interface to information retrieval 963 that work with the specific clients for storage (FS client), network (Net client 972) and PCO (PCO client 973) to retrieve information from their respective locations (on storage devices, internet or intranet, or their backing device) if information is not already available in memory. The NAS device 944 additionally provides the backing store for the PCO client 972 to persist key-value pairs that are evicted from the unified information cache.

The above example embodiments have been described herein above to illustrate various embodiments of implementing a system and method for providing dynamic information virtualization. Various modifications and departures from the disclosed example embodiments will occur to those having ordinary skill in the art. The subject matter that is intended to be within the scope of the present disclosure is set forth in the following claims.

I claim:
1. A system, comprising:
a virtual machine;
a host having a memory and a host device driver, the memory having a variable size; and
an optimization manager, wherein the optimization manager allocates the memory having the variable size for an optimization using a process identifier associated with a request for data from the virtual machine, wherein the optimization manager allows a first process to access a file via a first secure portal for the first process and blocks a second process from accessing the file via a second secure portal for the second process, the first process and the second process run in a same operating system; and wherein the file is accessed by a third process via a third secure portal for the third process, a first memory block corresponding to the file in the first secure portal being mapped to a third memory block corresponding to the file in the third secure portal.

2. The system of claim 1, wherein the optimization manager is embedded within a hypervisor of the host.

3. The system of claim 1, wherein the optimization manager uses properties in a runtime environment, the properties including one or more of: exclusivity of file accesses, profile feedback, a prediction of resource access patterns, and a need for consolidation of virtual machines onto a common host.

4. The system of claim 1, wherein the optimization manager provides process-level I/O virtualization including one or more of: recognizing and managing resources used by a process; sharing resources with other processes; protecting resources that are private to the process; and implementing the process-level I/O virtualization across multiple guest operating systems.

5. The system of claim 1, wherein the optimization manager provides process-level memory management including one or more of: tracking of memory used by resources belonging to each process; and when a process ends, reclaiming and making the resources belonging to the process available to other processes, the resources.

6. The system of claim 1, wherein the optimization manager provides process-level security management, including one or more of: enforcing security decisions agnostic of the guest operating system.

7. The system of claim 1, wherein the optimization manager temporarily assigns portions of the memory that are allocated to optimizations that are less active to optimizations that have a higher memory demand.

8. The system of claim 7, wherein the optimization manager reclaims the portions of the memory after the optimizations that have a higher memory demand complete.

9. The system of claim 1, wherein the optimization is one or more of direct rendering manager optimization, file system optimization, and socket optimization.

10. The system of claim 9, wherein the optimization manager apportions available memory for the optimization.

11. The system of claim 1, wherein the optimization manager maps a file block in a cache, implements shared heap, and operates on chunks of allotted memory.

12. The system of claim 11, wherein the optimization manager integrates the allotted memory into an address space of a guest process.

13. The system of claim 1, wherein the optimization manager modifies mappings of guest processes that are not running to increase available memory.

14. The system of claim 13, wherein optimization manager provides a list of virtual addresses for the guest processes.

15. The system of claim 1, wherein the optimization defines a callback, including one or more of a request to reclaim the memory, a request to flush the memory, and a request to refresh the memory.

16. The system of claim 1, wherein the optimization manager includes a host optimization driver in a host operating system, and a guest optimization driver in a guest operating system.

17. The system of claim 16, wherein the host optimization driver and the guest optimization driver are one or more of kernel modules, services, or applications.

18. The system of claim 16, wherein the guest optimization driver communicates with the host optimization driver via a hostcall.

19. The system of claim 16 wherein the guest optimization driver accesses data structures including one or more of resource descriptors, resource block descriptors, and data blocks.

20. The system of claim 16 wherein the host optimization driver accesses data structures including one or more of a process table, a resource table, a resource block table, an optimization registry, memory mapping tables, and data structures used during reclamation and writeback processes.

21. The system of claim 1, wherein the optimization manager further allows a third process and a fourth process of the operating system to access a second file via third and fourth secure portals for the third process and the fourth process, respectively.

* * * * *